United States Patent [19]

Yasuoka et al.

[11] Patent Number: 5,574,881

[45] Date of Patent: Nov. 12, 1996

[54] HIGH CAPACITY DATA STORAGE METHOD AND SYSTEM USING INDEPENDENTLY CONTROLLED HEADS AND CIRCUITRY FOR MONITORING ACCESS FREQUENCY OF DATA RECORDS

[75] Inventors: Hiroshi Yasuoka, Fujisawa; Yoshito Tsunoda, Suginami-ku; Takeshi Maeda, Kokubunji; Yoshihisa Kamo, Musashimurayama; Hiromichi Fujisawa, Tokorozawa; Zenji Tsutsumi, Kokubunji; Shunichi Torii, Musashino, all of Japan

[73] Assignee: Hitachi, Ltd., Tokyo, Japan

[21] Appl. No.: 511,779

[22] Filed: Aug. 10, 1995

Related U.S. Application Data

[63] Continuation of Ser. No. 406,798, Sep. 13, 1989, abandoned.

[30] Foreign Application Priority Data

Sep. 19, 1988 [JP] Japan .................................. 63-232365

[51] Int. Cl.$^6$ ............................ G06F 13/00; G06F 12/12; G11B 17/22
[52] U.S. Cl. ......................... 395/439; 395/486; 395/492; 395/495; 369/30; 369/34; 360/98.01; 364/DIG. 1; 364/246.13; 364/248.1; 364/264.4; 364/948.3; 364/948.31; 364/952.1; 364/961.3
[58] Field of Search .................................... 395/438, 439, 395/440, 460, 463, 486, 487, 492, 835, 838, 495; 369/30, 34; 360/98.01

[56] References Cited

U.S. PATENT DOCUMENTS

| | | | |
|---|---|---|---|
| 4,270,154 | 5/1981 | Crawford | 360/98.01 |
| 4,577,240 | 3/1986 | Hedberg et al. | 360/98.01 |

FOREIGN PATENT DOCUMENTS

| | | |
|---|---|---|
| 3318279 | 11/1984 | Germany . |
| 85/04510 | 10/1985 | WIPO . |

OTHER PUBLICATIONS

Patel, "Zero–Modulation Encoding In Magnetic Recording," IBM Jour. Res. Devel., vol. 19, No. 4, pp. 333–378, Jul. 1975.

"Effective File Allocation Method Onto Disc Devices", Kondo, et al., Proceedings of the 8th IFIP Conf. on Optimization Techniques, pp. 473–83, Sep. 1977.

"Stored Document Access Time", Gibbard, et al. IBM Technical Disclosure Bulletin, vol. 21, No. 9, pp. 3801–3802, Feb. 1979.

"Disk File Storage System", Patent Abstracts of Japan, vol. 12, No. 350, (p-760) (3197), Sep. 1988 (JP 63–104201).

Primary Examiner—Glenn Gossage
Attorney, Agent, or Firm—Fay, Sharpe, Beall, Fagan, Minnich & McKee

[57] ABSTRACT

A fast access high capacity data storage system and method are disclosed, the data storage system including a disk-based storage system employing a plurality of storage surfaces. Selected storage surfaces have a plurality of independently controlled data access heads in data communication therewith, and circuitry is provided for allowing concurrent data transfers through the plurality of data access heads. Performance is further improved by monitoring frequently accessed data records and transferring them to a copy recording surface or recording surfaces less frequently used, and by moving a data access head of the plurality of data access heads to other recording surfaces to decrease access bottlenecks. The storage system further includes circuitry for averaging at least one of record length data, transfer timing data, access timing data and address data.

6 Claims, 19 Drawing Sheets

HIGH CAPACITY DATA STORAGE METHOD AND SYSTEM USING INDEPENDENTLY CONTROLLED HEADS AND CIRCUITRY FOR MONITORING ACCESS FREQUENCY OF DATA RECORDS

This is a continuation of U.S. application Ser. No. 07/406,798 filed Sep. 13, 1989, now abandoned.

BACKGROUND OF THE INVENTION

The present invention relates to a high-density and large-capacity storage drive and, more particularly, to a storage drive capable of permitting fast writes or reads. Fast writes and reads are permitted even where the storage drive is simultaneously accessed by a plurality of users.

Storage drives of the prior art have typically had low recording densities which have rendered large capacities difficult to realize, even in such cases where high speed access is possible, such as in magnetic disk drives. Conversely, storage drives using magnetic tapes or optical disks arrayed in a "juke box" form provide high capacity, but have a low throughput given their extremely slow access periods. Earlier technology therefore renders it difficult to allow for concurrent access to a mass storage medium from a plurality of associated user terminals.

In earlier systems, large capacity and high-speed access was typically realized by using a magnetic disk as a buffer (or cache) of a magnetic tape library or an optical disk library. Where a certain data record is accessed, according to this method, its neighboring data is also copied from the magnetic or optical disk into the buffering magnetic disk. In this way, data written in a physically near address, having a high probability of being accessed within a concentrated time, can be quickly accessed.

In the technology thus far described, data to be accessed is not originally present on the magnetic disk. Accordingly, a target magnetic tape or optical disk has to be set forth in the drive from the magnetic tape or optical disk library so that the data may be loaded. Such loading often takes several seconds. As a result, in the event that the file device is shared among a plurality of terminals, and in cases wherein continued accesses to data not present on the magnetic buffering disk are demanded, there arises a problem that the access requests are accumulated. This situation invites a state in which a system is incapable of performing the desired transactions.

Use of hybridized storage media raises another problem given that such a storage drive is costly.

The subject invention solves the above referred problems, and others, and provides a single medium mass-storage system which is capable of providing fast and efficient access to mass storage by a plurality of users.

SUMMARY OF THE INVENTION

In accordance with a first aspect of the present invention, there are provided, in communication with each surface of a plurality of optical disk surfaces, either at least one writing and readout head and at least one readout head or at least two writing and readout heads, which are controlled independently or simultaneously.

In accordance with another aspect of the present invention, frequently accessed data on the recording surfaces is relocated to a recording surface which is accessed less frequently.

In accordance with another aspect of the present invention, there is provided either a writing and readout head or a readout head capable of moving between recording surfaces.

In accordance with another aspect of the present invention, data access is simultaneously provided to at least two recording surfaces.

In accordance with a more limited aspect of the present invention, various combinations of the foregoing are provided to further increase system performance.

An advantage of the present invention is the provision of an inexpensive data storage drive which has a super large capacity but can be accessed at a high speed simultaneously and instantly from a plurality of terminals.

BRIEF DESCRIPTION OF THE DRAWINGS

The invention will described in conjunction, with a series of drawings wherein the purposes are for illustrating the preferred and alternate embodiments of the subject invention only, and not for the purpose of limiting the same, wherein.

DETAILED DESCRIPTION OF THE PREFERRED AND ALTERNATE EMBODIMENTS

Figure 1:
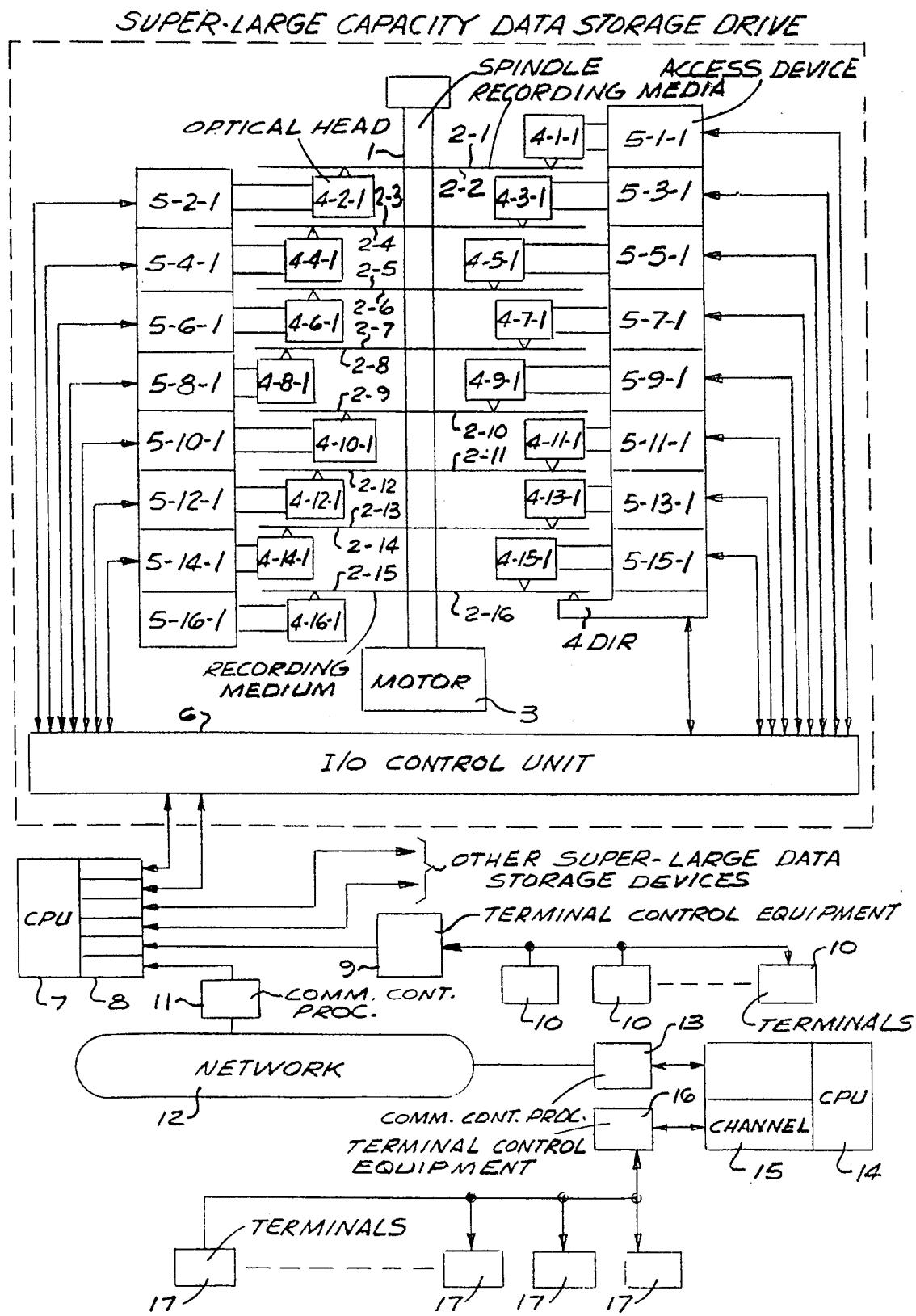
FIG. 1 is a diagram showing one embodiment of the overall basic structure of the present invention.

Turning now to the drawings, FIG. 1 is a diagram showing the structure of a super-large capacity data storage drive according to the present invention. In the example of FIG. 1, on a common spindle 1 there are fixed eight disks of a dual-sided or dual surfaced recording media 2, which are rotated by a motor 3. For each recording surface, there is provided an optical head 4 in generally closed proximity, and a target address which is accessed by an access device 5. Data input and output are supervised by an input/output control unit 6. For ease in understanding a numbering representation has been utilized which is as follows:

[reference no.]–[recording surface no.]–[head in the surface]

As with earlier systems, the super-large capacity data storage drive of the subject system is suitably connected with a CPU 7 through channels 8, as shown in FIG. 1. The present storage drive is accessed by the user from the CPU 7 or through the channels 8, terminal control equipment 9 and terminals 10. The storage drive may also be accessed from another CPU 14 through a network 12 and communication control processors 11 and 13.

The CPU 14 is naturally connected through channels 15 and terminal control equipment 16 with terminals 17. In cases of large amounts of information, a decline of throughput due to busy channels can be prevented if the channels 8 are increased to provide a plurality of paths. At this time, these channel paths are usually selected by the dynamic control method. Thus, the present invention provides a super-large capacity data storage drive which is connected to plural terminals so that it can handle access requests of many users simultaneously.

Figure 2:
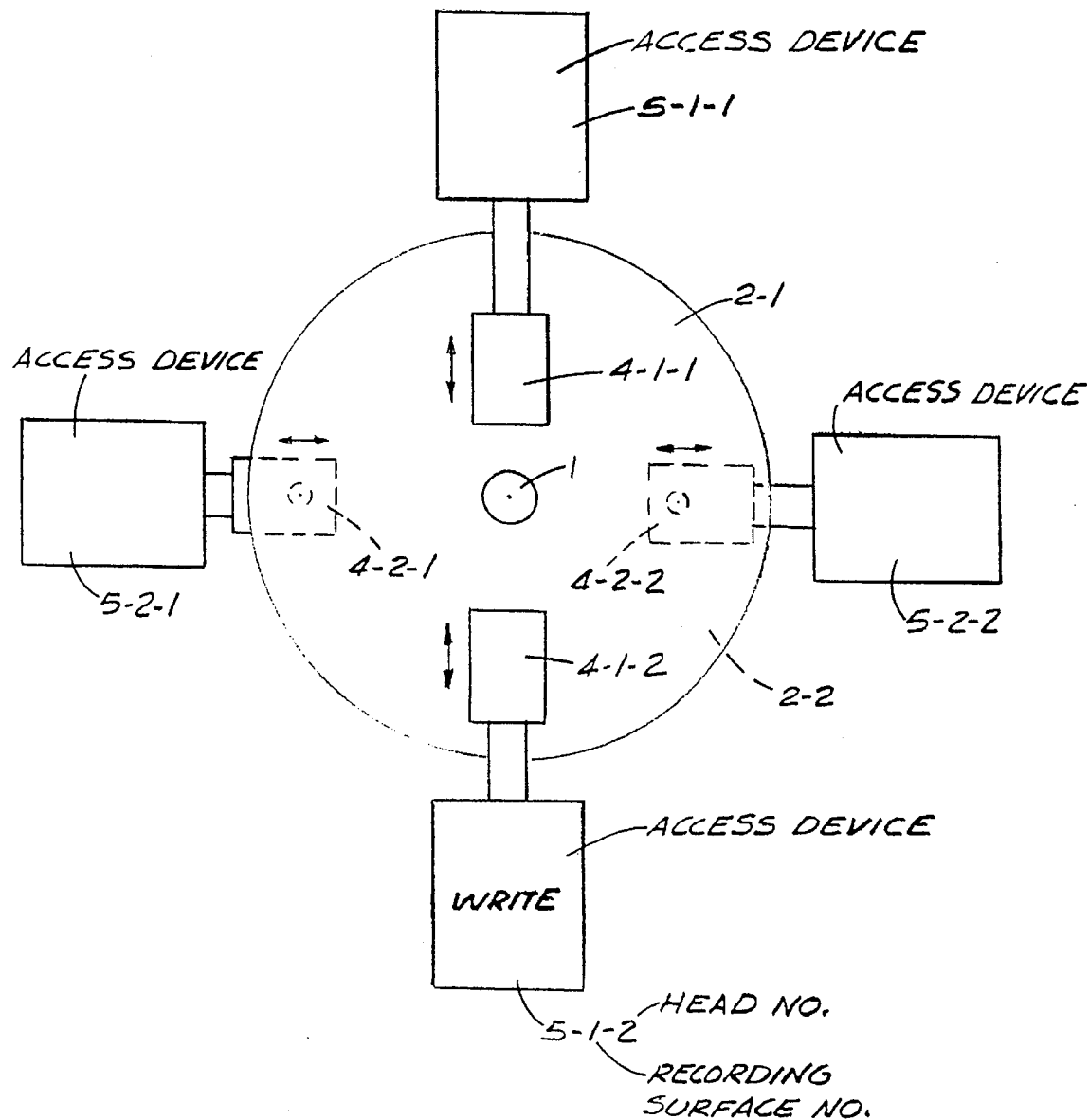
FIG. 2 is a diagram showing the optical head structure of the present invention.

FIG. 2 shows one example in which one recording surface is equipped with two optical heads. Since readout frequency is generally higher than the writing frequency, the structure can be made at a reduced cost by utilizing one read/write head and a read-only head. The optical heads are suitably arranged such that optical heads 4-1-1 and 4-1-2, which can be independently accessed by the access devices 5-1-1 and 5-1-2, are opposed to one another on a recording surface 2-1 of the recording medium 2. On the back side, the optical heads 4-2-1 and 4-2-2, which are independently accessed by the access devices 5-2-1 and 5-2-2, are likewise arranged to oppose one another. In the figure, each of the recording surfaces is in communication with two or more optical heads. Throughput may be further improved by utilizing greater numbers of recording surfaces and optical heads per surface, as has been described above.

The present embodiment is exemplified as having thirty two optical heads given that each of sixteen recording surfaces is equipped with one read/write head and one readout head, which are driven independently of one another.

The recording medium 2 is exemplified by a dual-sided recording phase change optical disk. The recording film to be used is exemplified by a phase change recording film suitably made of In—Se—Tl—Co which will crystallize in 100 ns or less, as disclosed in Japanese Journal of Applied Physics (J.J.A.P.), Vol. 26, pp. 67, (1987) Suppl. 26-4.

Data is written by changing the intensity of a coherent optical beam over a time between an intermediate level for crystallization, and a high level for non-crystallization, in accordance with encoded information, and by changing a phase state of the phase change recording film into a crystalline or non-crystalline state. In accordance with this phase state change, the refractive index is changed with the optical path of the interface and the reflectivity of recording film. Data reads are accomplished by illuminating the recording film with an optical beam so weak as to cause no phase change, and by the amount of the light reflected from the recording film by means of the optical head 4. This data writing and readout method is disclosed in detail in Japanese Patent Publication No. 62-259220 and U.S. Pat. No. 5,123,007.

Data can be rewritten more reliably by either erasing at one side while writing at the other or overwriting at one side while monitoring at the other side via two optical spots. The recording medium 2 is exemplified by the phase change recording film in the present embodiment but may be replaced by a magneto-optic recording film represented by Tb—Fe—Co, if the recording medium 2 is used as a data base requiring no data rewrites. On the other hand, it may be exemplified by either a perforated recording film, such as is disclosed in Japanese Patent Publication No. 59-19836 or a ROM disk such as a video disk.

A tracking guide mark may be exemplified by a pregroove or a known or pre-wobbled (physical location already ascertained) mark. In order to minimize eccentricity, however, the guide groove may be written by the read/write head after the disk has been fixed. The header may be formed in advance with the mark but is desirably formatted by the read/write head after the disk has been fixed.

The optical head 4 has substantially the same structure as that of a head of a write-once-read-many ("WORM") optical disk now commercially available. Accordingly a dedicated description thereto will be omitted.

The present optical head 4 is made movable within a range from the innermost to outermost tracks to perform a coarse access by the access device 5, which access device has a linear motor. However, this access device 5 may be driven by a rotary motor. On the other hand, the tracking method is accomplished like the WORM optical disk drive, for example, by a two-step control to control slow tracking by the access device 5, and fast tracking by an actuator in the optical head. The data transfer rate is improved if the optical head 4 is exemplified by the parallel read/write optical head using a semiconductor laser array, as disclosed in Japanese Patent Publication No. 62-173930. The optical head can be made lightweight to shorten the access time if a semiconductor laser and a signal detecting optical system are stationary whereas the optical system consisting of an objective lens is movable, as disclosed the publication O plus E, Vol 67, pp. 8 (March, 1986, New Technology Communications Co., Ltd.; (Shin Gijutsu Komyuni Keshonzu) 16-13, Hyakunin-cho 2-Chome, Shinjuki, Tokyo 141 Japan). The optical head can be made thin and light weight if it uses optical fibers, as disclosed in Japanese Patent Publication No. 62-249938.

Figure 3:
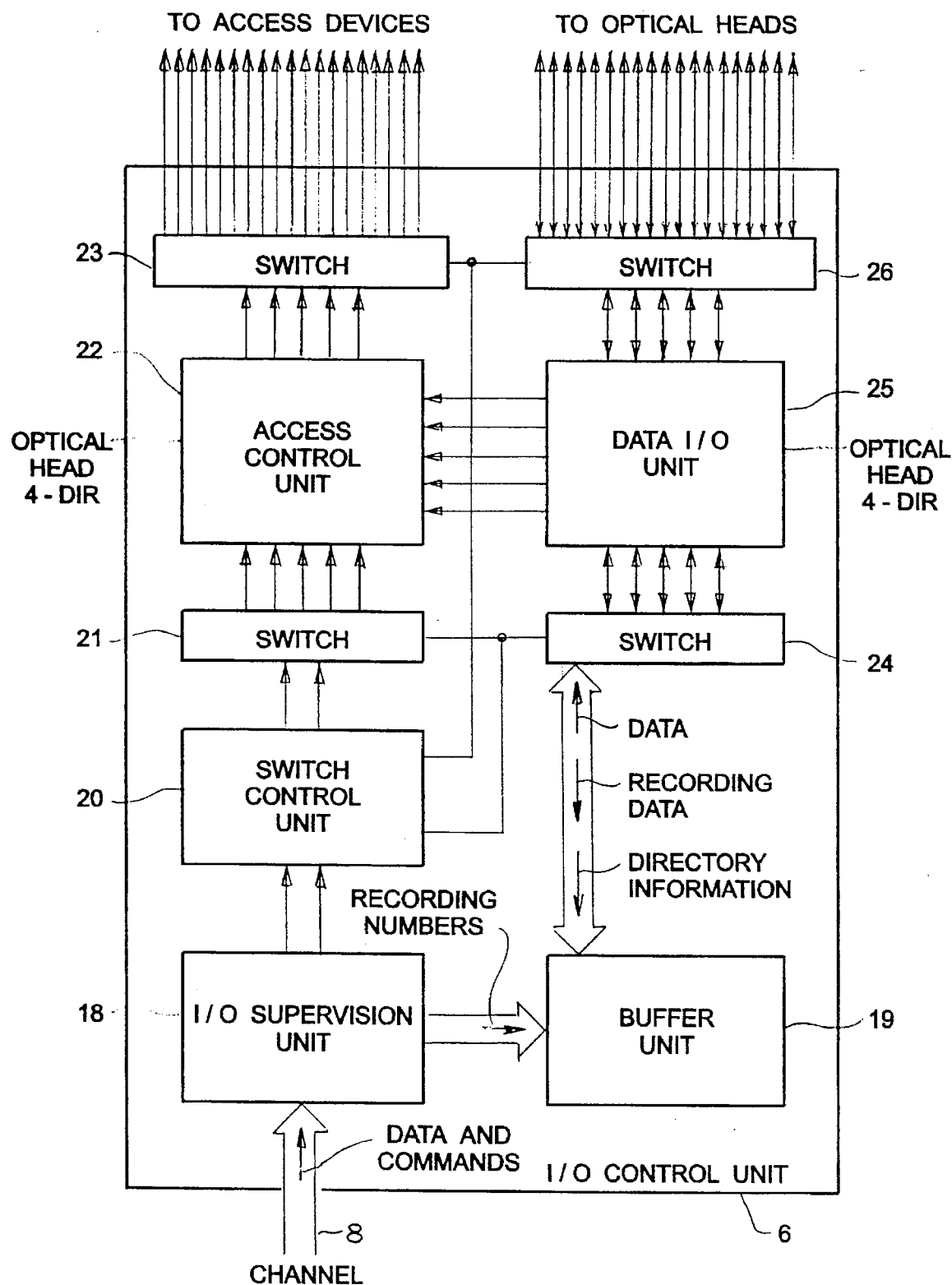
FIG. 3 is a diagram showing one embodiment of structure forming an input/output control unit.

The input/output control unit 6 includes, as shown in FIG. 3, an input/output supervision unit 18, a buffer unit 19, an access control unit 22, and a data input/output unit 25. The signal lines from the I/O CONTROL UNIT to the OPTICAL HEADS are not shown in the figure for clarity. The input/output supervision unit 18 first accesses a directory in the buffer unit 19 on the basis of data accessed through channel 8. The supervision unit 18 extracts data, if any, from the buffer unit 19, and otherwise accesses the recording medium 2. The buffer unit 19 functions similarly to existing semiconductor cache memories. However, the buffer unit 19 contains the directory. The input/output supervision unit 18 issues an access command to the access control unit 22 to move the optical head based on the physical address on the disk stored with the data. The access control unit 22 accomplishes the head drive control to the recording address expressed by the recording surface, track or sector, the auto-focusing and the auto-tracking.

The data input/output unit 25 functions primarily to modulate and demodulate, and to correct and save data. One access device 5 is provided for each of the optical heads so as to drive each of them independently. Since, however, all the optical heads are not always operating, the numbers of the circuits of the access control unit 22 and the data input/output unit 25 may be less than that of the optical heads. Then, a switch control unit 20, and switches 21, 23, 24 and 26, select the circuits in the access control unit and the data input/output unit. Circuits in the access control unit 22 and data input/output unit 25 have a one-to-one correspondence so that the switches 21, 23, 24 and 26 are mutually associated.

In this respect, the present embodiment is equipped with five access control circuits and data input/output circuits, but a decline in throughput due to busy control circuits and data input/output circuits can be better prevented with a larger number of the circuits. Throughput, when accesses are concentrated, is improved, but production cost is raised in relation to an increase in the number of control circuits and input/output circuits.

Next, the writing and readout method of the super-large capacity data storage drive will be described with reference to FIG. 3. Data and commands to be stored are transferred from the channel 8 to the input/output supervision unit 18. This input/output supervision unit determines the recording numbers, such as the numbers of the recording surfaces, tracks or sectors, which are usually saved in the directory region of the buffer unit 19. Moreover, the recording surface also includes a directory region, utilizing either a fixed head having a fine actuator or a movable head having a small moving distance so that it may rewrite occasionally, periodically or when power is interrupted. Here, the fine actuator is independently controlled by the access control unit.

Directory information is wholly loaded in the buffer unit 19 from the directory region of the recording medium 2 when power is supplied. After the determination of the recording address, an access command is issued to the access control unit 22 to transfer data to the buffer unit 19. Here, data input/output unit 25 always issues the data indicating the state of use and position (i.e., track) of each head as its signal to the access control unit 22, so that this access control unit drives the optical head belonging to the appointed recording surface of the access device 5 to start a coarse access. Simultaneously as the target track is approached, the tracking actuator in the optical head is driven to start the fine access. Here, the automatic focusing is accomplished by controlling the objective lenses to the focal plane at all times by the auto-focusing actuator. The data transferred to the buffer unit 19 is written in the semiconductor memory of the buffer unit and transferred to the data input/output unit 25.

High volume data, such as motion picture data, is transferred to the data input/output unit by interrupting the writing to the semiconductor memory. In the data input/output unit 25, the transferred data is transformed into codes suited for the recording medium. In case the phase change recording film is used, "2-7" modulation, "4-15" modulation and the MFM (modified frequency modulation) modulation are suitable as will be appreciated by one of ordinary skill in the art. As these modulators are familiar to those of ordinary skill in the art, their description will be omitted. The modulated data is saved in the buffer of the data input/output unit. The access control unit 22 always read out the readout signal from the optical head 4 through the data input/output unit 25 and issues the data output command to the data input/output unit 25, simultaneously as the optical spot reaches the target sector, so that it sends out and writes the data from the buffer of the data input/output unit. Since, however, access control unit 22 and the data input/output unit 25 are fewer in number than that of the optical heads, the free circuits of the access control unit 22 and the data input/output unit 25 are selected by the switch control unit 20 and switched by the switch units 21, 23, 24 and 26.

Next, a method of reading out data will be described. When a data readout requirement enters the input/output supervision unit 18 through the channel 8, the directory of the access requirement data is read out from the directory region of the buffer unit 19. The directory dictates whether or not it is in the buffer, its address, if the answer is YES, and the recording surface number, track number and sector number of the data recording medium. The access requirement data is read out in the event that it is in the buffer unit. If NOT, an access command is issued to the access control unit 22. If the optical head 4 is free, as in a writing case, the data input/output unit 25 starts demodulating the encoded data to the original data to save the data in the buffer of the data input/output unit 25 simultaneously as the optical spot reaches the target sector. The data of one block is read out and demodulated and is instantly transferred to the buffer unit 19. In case the optical head 4 is operating, the access is suspended until completion of the data transfer from the optical head. The buffer unit 19 stores the readout data in the semiconductor memory and transfers it to the CPU through the channel 8. In case the recording surface having the read/write head and the readout head is accessed, the readout head is preferentially used for the readout.

Figure 4:
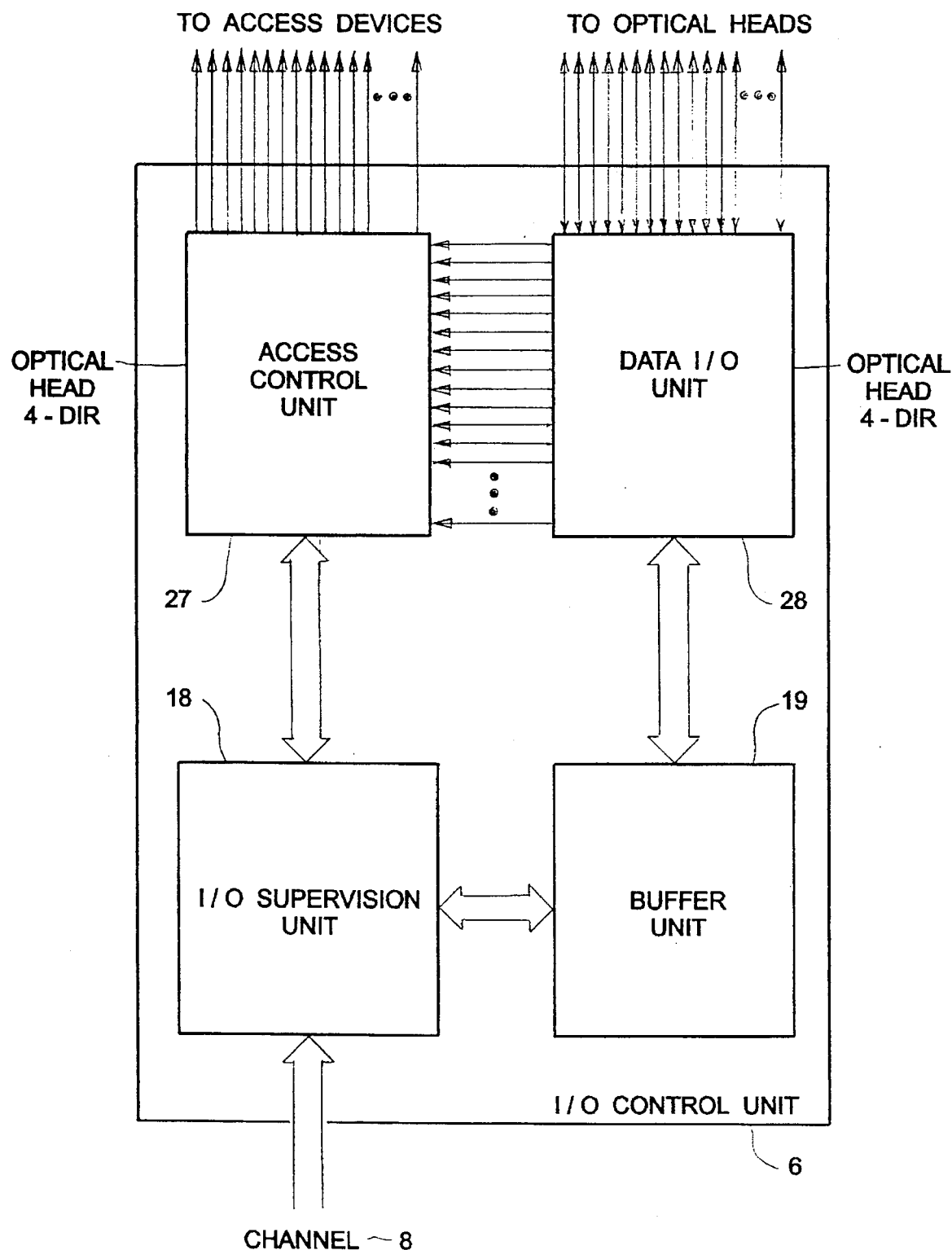
FIG. 4 is a diagram showing one embodiment of structure forming an input/output control unit.

Another embodiment having a higher throughput than that of the data storage drive of the foregoing embodiment will now be described. This embodiment has a basic structure similar to that of the foregoing embodiment, but is equipped with two read/write heads for each recording surface, an equivalent number of circuits to the total number of the read/write heads in the access control circuit and the data input/output unit. The structure of the input/output control unit 6 is shown in FIG. 4.

In this embodiment, the input/output control unit 6 is equipped with two optical heads at both sides of each of eight disks, giving a total of thirty two read/write heads. Moreover, each head is always controlled by the individually assigned circuits in an access control unit 27 and a data I/O unit 28. Here, the head is usually positioned in the track which has been accessed most recently, but may be held in an appointed standby position. This standby position is appointed, for example, by dividing an associated access range by a number of the heads per recording surface, and by determining the respective centers of the divided ranges. Thus, the average access time can be shortened. Further, an access time for nearby accesses is frequently associated with a physically proximate address, so that the head is desirably held standby in the track which has been most recently accessed.

Figure 5:
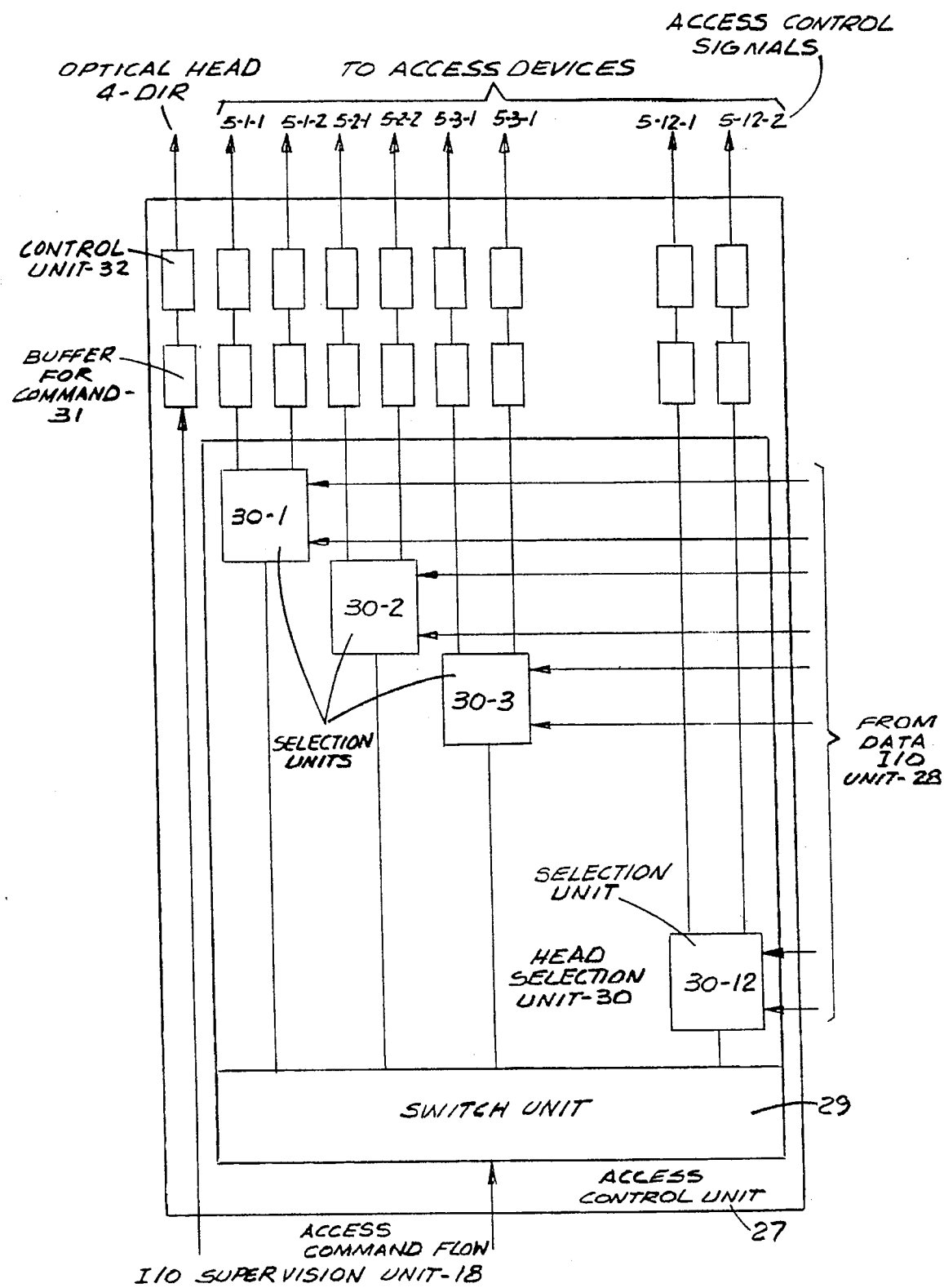
FIG. 5 is a diagram showing one embodiment of structure forming an access control unit.

In another variation, the access control unit 27, which is different from that of the foregoing embodiment, is shown in FIG. 5. This access control unit 27 includes a switch unit 29, a head selection unit 30, a command buffer 31, and a control unit 32. The switch unit 29 switches to the circuit corresponding to the appointed recording surface in accordance with the physical address (e.g., the recording surface number, the track number, or the sector number) appointed by the input/output supervision unit.

The head selection unit 30 is provided for determining which of the two optical heads belonging to each recording surface is to be used for accomplishing the writing or readout. This determination is made from the head position data from the data input/output unit 28, and the head standby data from the command buffer 31.

Figure 6:
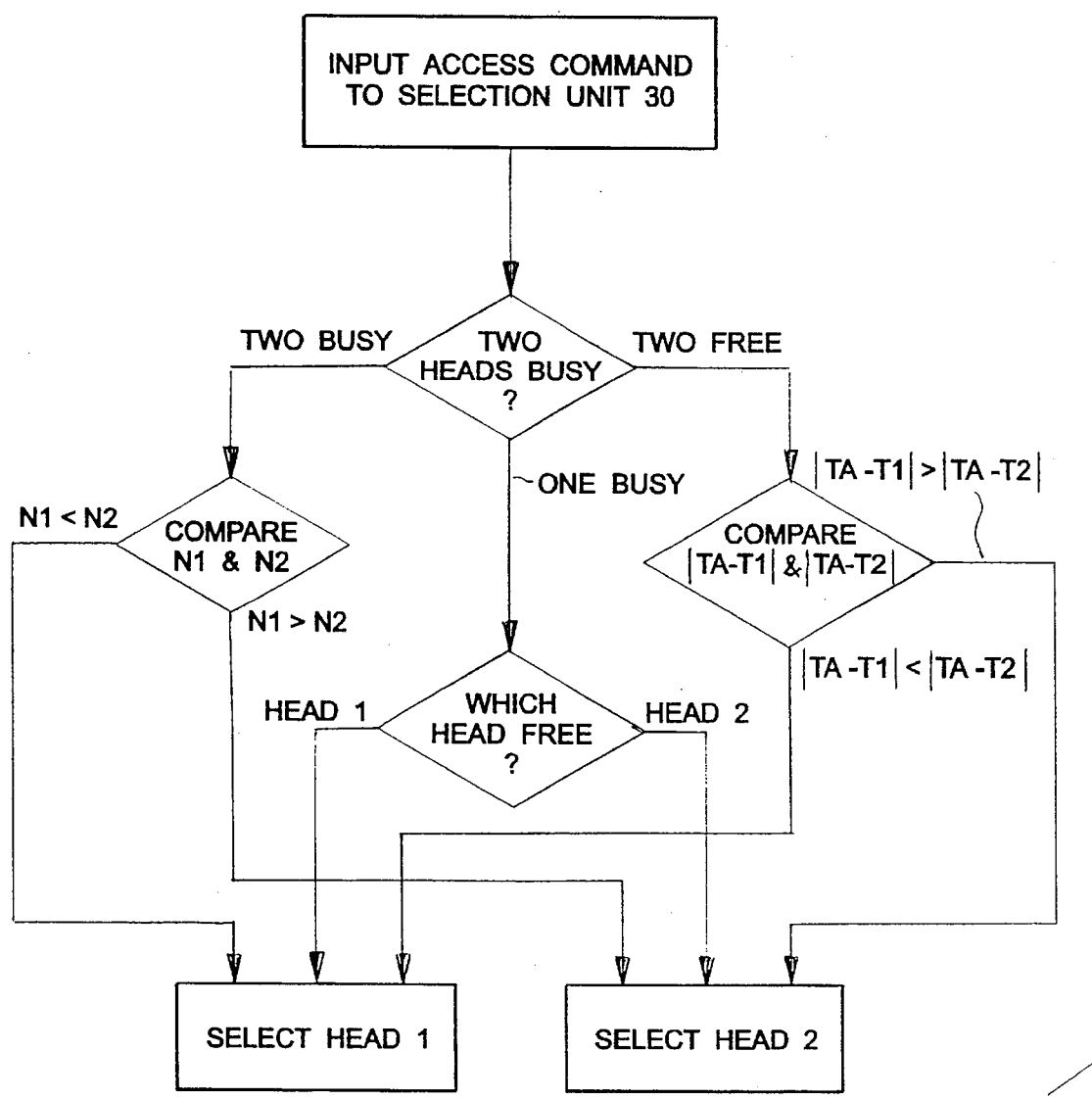
FIG. 6 is a flow chart showing one example of the head selecting procedures of the access control unit of the storage drive having two writing and readout heads in communication with its recording surface.

The procedures for the head selection unit 30 to select the head are shown with reference to FIG. 6. First of all, whether or not the two heads are busy is determined from the signal coming from the data input/output unit 28. If the two heads are free, the head having a smaller difference between the track number to be accessed and the track number in which the head is positioned, is selected for the access. If one head is accessing or transferring data, the access command is issued to the free head. If, on the other hand, the two heads are busy, the command is issued to the selected optical head which has a smaller number of access standby commands.

The command buffer 31 functions to count the number of standby commands. This standby command number is determined in relation to commands stored by the command buffer. Moreover, the head is selected in a like manner, too, in case each recording surface is equipped with three or more heads.

Figure 19:
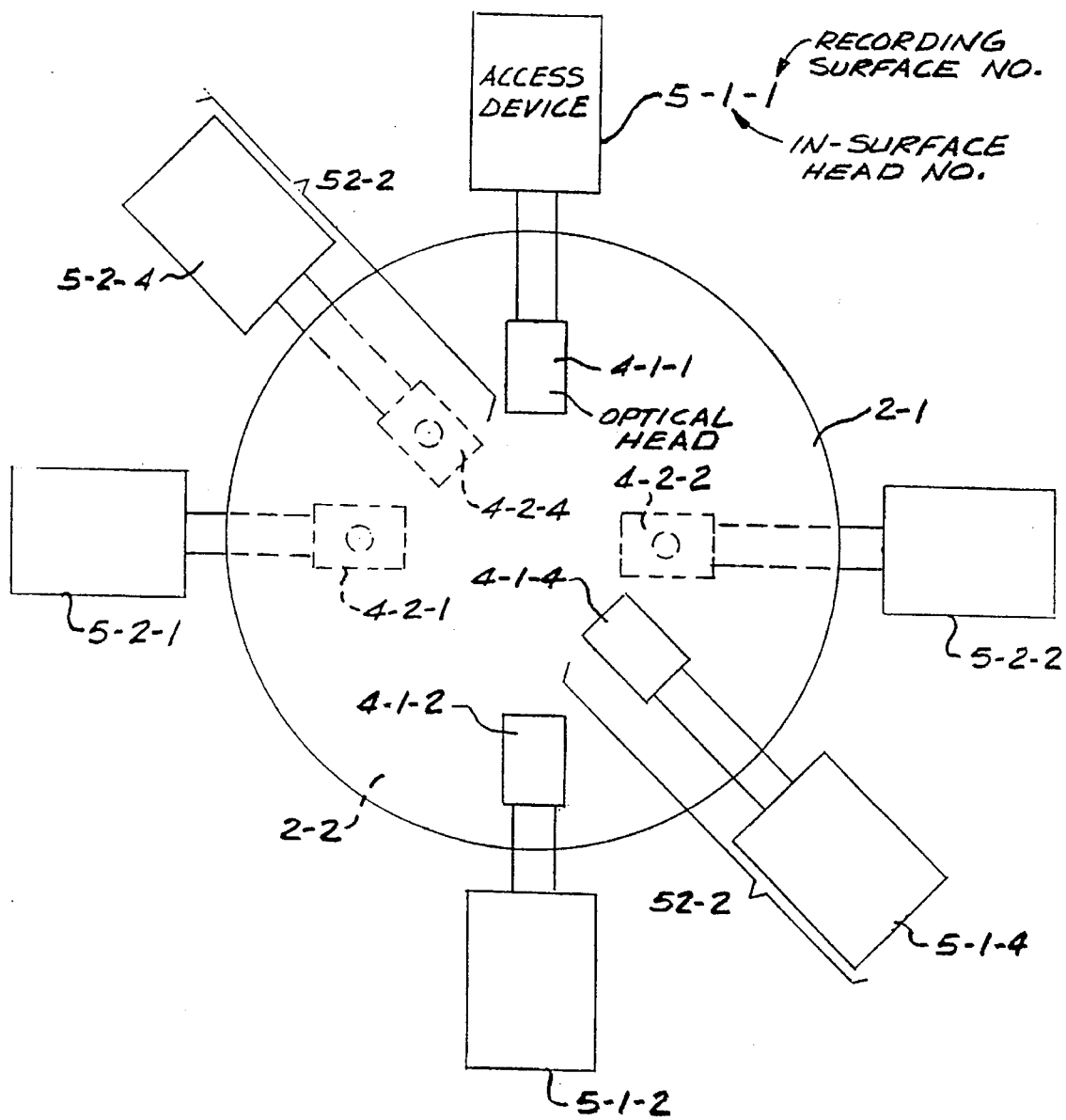
FIG. 19 is a diagram showing the structure in case the head assembly device is mounted.

There is a tendency that the number of terminals to be connected with the network system, and the number of their users, will increase over time. Such increased usage will correspondingly augment the access frequency. The data storage drive is therefore advantageously equipped for mounting of one or more additional head assemblies. An additionally mountable head assembly may be exemplified, as shown in FIG. 19. Illustrated therein is a head assembly 52-1 for the surface corresponding to heads 4-1-1 and 4-1-2, access devices 5, and a head assembly 52-2 for the back side of the disk. At the same time, the necessary access control circuits and data input/output circuits are provided.

In the data storage drive thus far described in connection with the first embodiment, access requirements will accumulate to elongate the standby time abruptly in case they are simultaneously concentrated on a common recording surface. Therefore, another embodiment of the super-large data storage drive provides a system to move selected items of the recording surfaces having a high access requirement frequency, to a surface having a lower access requirement frequency. This system will be described with reference to FIG. 7.

Figure 7:
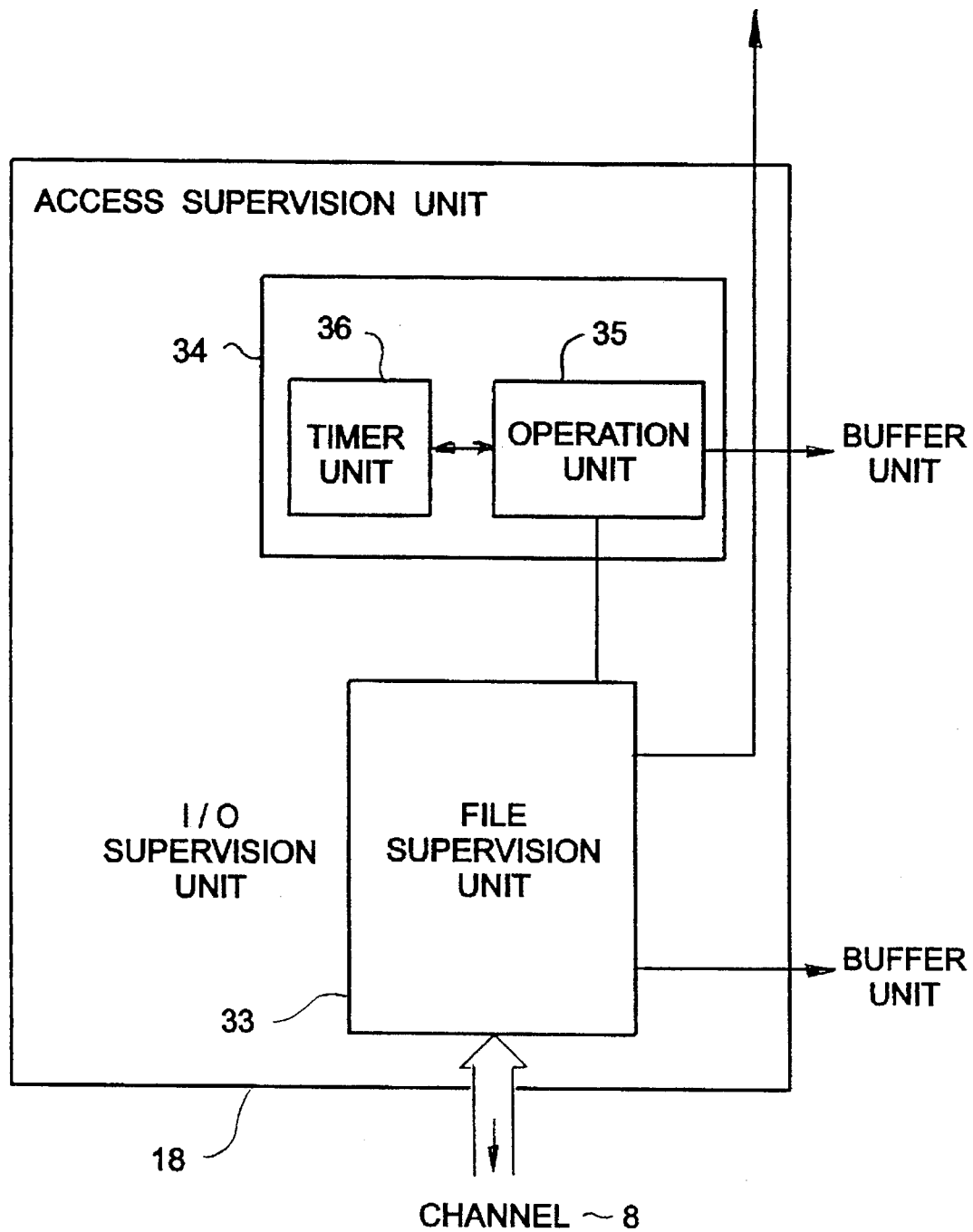
FIG. 7 is a diagram showing one embodiment of structure forming an input/output supervision unit.

This embodiment differs from the first embodiment in the structure of the input/output supervision unit 18. In the present embodiment, the input/output supervision unit is equipped, as shown in FIG. 7, with a file supervision unit 33 for supervising the storage of an address of the data, and an access supervision unit 34 for writing a period or frequency of writing, retrieval, readout or rewriting.

The access supervision unit 34 includes a timer unit 36 for determining access time, and an operation unit 35 for determining an access state. This access state is dictated by the sum of the final access period of each data element written, the access period of each recording surface, and the capacity of the recording medium. The access state is computed in the following manner. Upon each access, the access supervision unit 34 writes the access time in the directory of the buffer 19 and determines the difference between the access time previously written and the present access time by the operation unit 35. The access state of the buffer unit 19 is thereby rewritten each time. Here, it is desirable to make a storage of the access time before an appointed number of accesses. It is thereby possible to determine an average access period which is weighted toward the most recent access.

The data transfer is accomplished by the file supervision unit 33 on the basis of the access state which is written in the buffer unit 19 supervised by the access supervision unit 34, as will be described in the following.

At the instant when accesses are made for reading out and rewriting the data to update the various access states, it is decided whether to transfer the data at or less than a predetermined capacity of a certain average access period, to another recording surface (i.e., the recording surface having the highest access frequency) to a recording surface having the least frequent access periods. At this time, the above-specified data is available for access such as a read out or write, or is maintained in a standby state for such access. When the writing and readouts end, data always exists in the buffer 19 if it has sufficient available capacity. However, in the event that sufficient capacity does not exist in the buffer 19, it is not transferred. The destination of the recording surface is then suitably determined to have the largest sum of the access periods (or the least access frequency).

The file supervision unit determines a target destination recording surface and commands a write by the access control unit, simultaneously as the aforementioned data is written in the buffer unit. The data is copied if the head of the recording surface of the destination is free, and is written, if the head is busy. As soon as a written signal is communicated to the file supervision unit 33, the directory is rewritten to a new address. During and after the transfer, the old address is handled as an unwritten one. On the other hand, a data transfer may be accomplished at a high rate with less access frequency. In this case, the data to be transferred is temporarily loaded in the buffer unit 19 and then written in the destination address.

Figure 8:
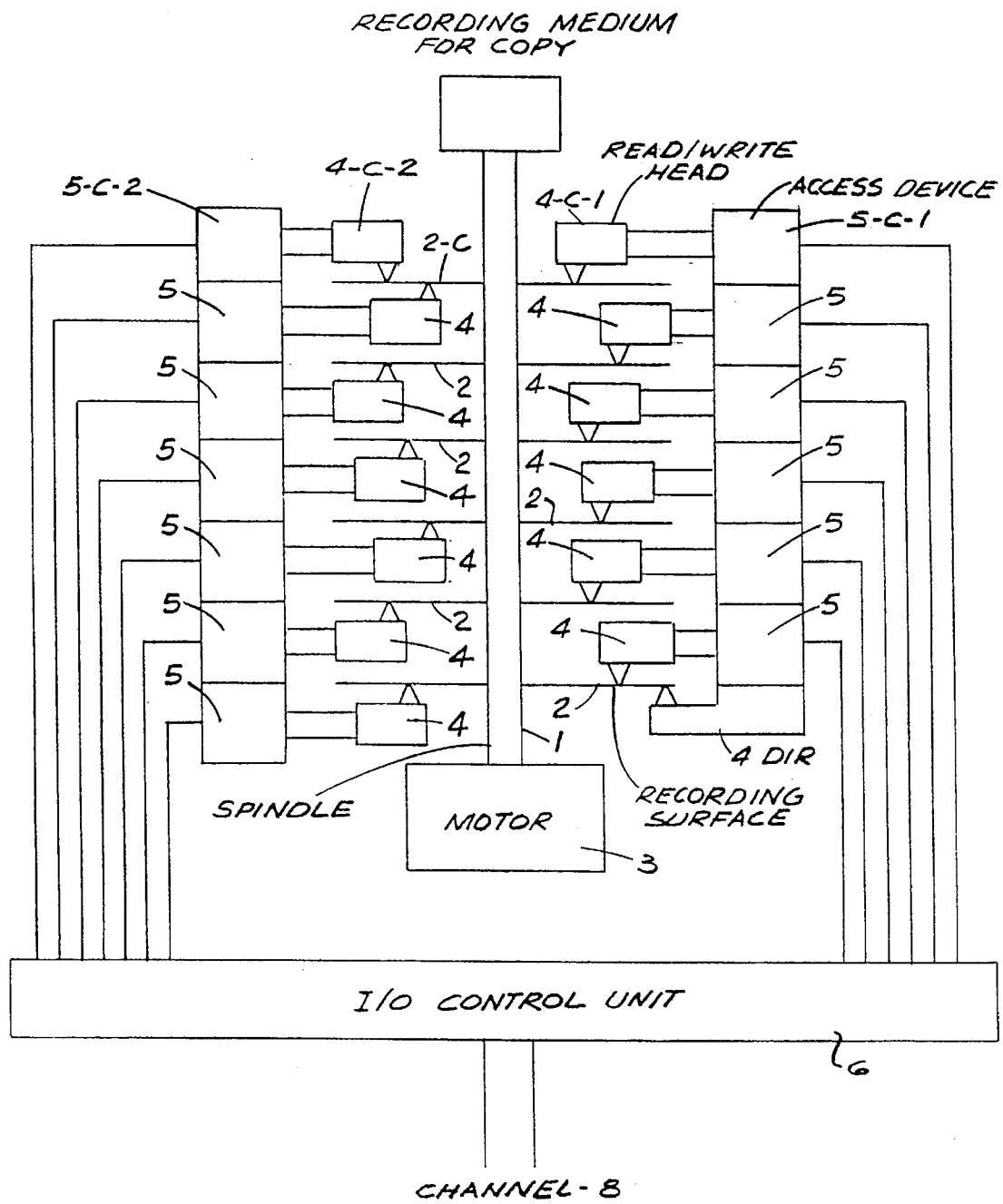
FIG. 8 is a diagram showing one embodiment of a storage drive having recording surfaces for copying of data.

Another embodiment of the super-large capacity data storage device having the copy recording surface for copying a data having a high access requirement frequency will be described in the following with special reference to FIG. 8. By way of example, the surface of the highest disk of FIG. 8 is used as the copy recording surface designated at 2-C. Moreover, this recording surface 2-C is equipped with two read/write heads 4-C-1 and 4-C-2 which can be independently accessed. In order to improve the throughput, moreover, it is desirable to provide as many independently accessible read/write heads as possible. The recording surface 2-C does not record any new data but copies data recorded in another recording surface, which has a high readout access frequency.

In the operation unit 35 of the access supervision unit 34 shown in FIG. 7, data of the recording surface having a shortest readout access period is appointed when the maximum of the sum of the readout access periods of the individual recording surfaces written in the buffer unit 19 reaches a predetermined value. The file supervision unit 33 issues, to the access control unit, a command for copying that data in the recording surface. The copying method is omitted here because it is similar to that of the embodiment 3. Here, the old directory of the copied data is rewritten by adding flag data indicating that the copy data is present in the recording surface for copy and the directory of the copy data. Moreover, the data can be accessed for copying from both the recording surfaces.

Figure 9:
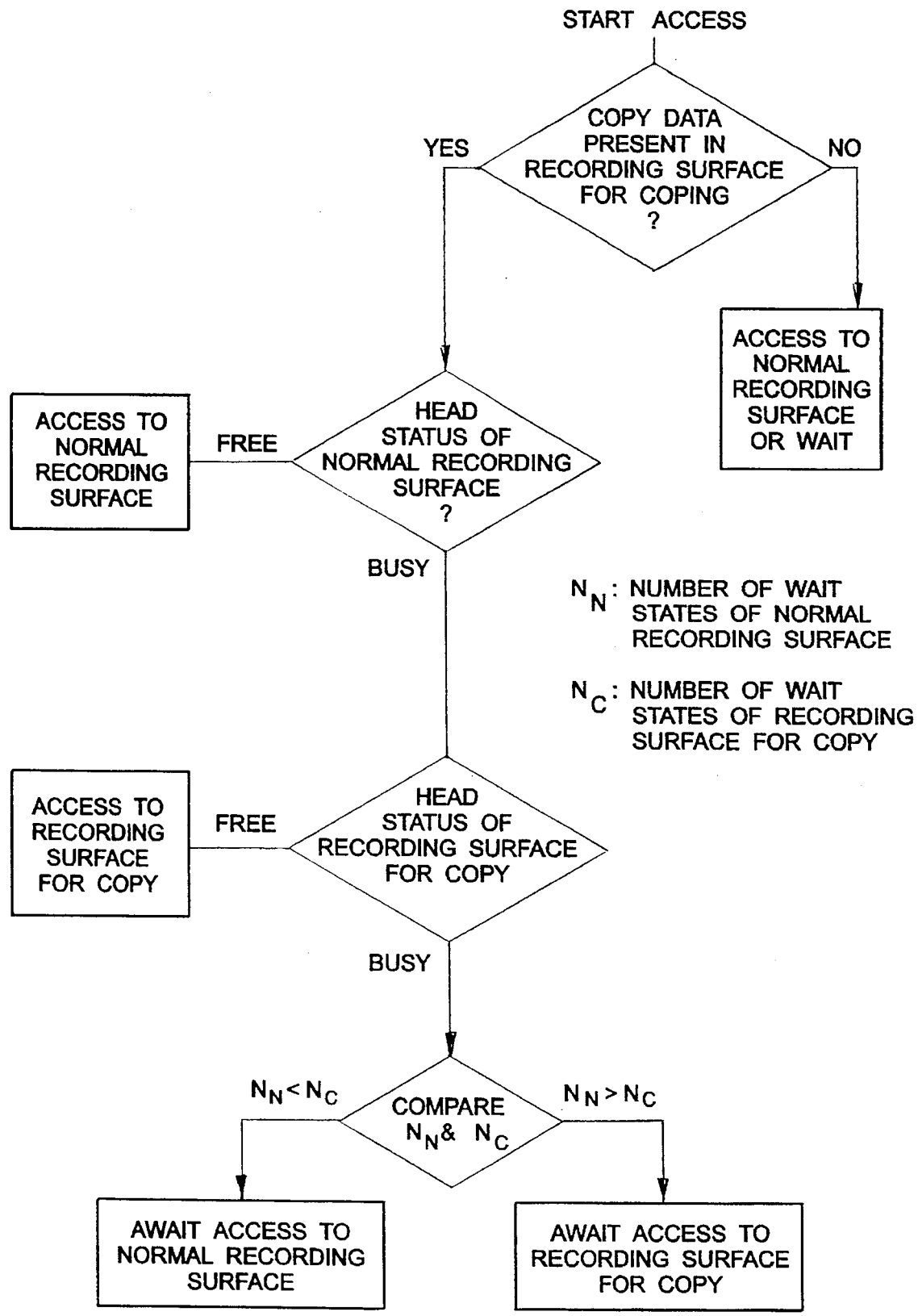
FIG. 9 is a flow chart showing an accessing procedure of the storage drive having the recording surfaces for copying of data.

The procedures for reading out the data will be described in the following with reference to the flow chart shown in FIG. 9. First of all, it is recognized by a flag in the directory whether copy data is present in the recording surface for copying. If the copy data is not present (NO), the normal recording surface is accessed. If the copy data is present (YES), the optical head of the normal recording surface is accessed, and this access is executed if the head is free. If the head of the normal recording surface is busy, the recording surface for copying is accessed. If this recording surface for copying is free, the access is instantly started. If all the optical heads are then busy, the numbers of the access standby states of the normal recording surface and the recording surface for copy are compared to issue the access command to the recording surface having the smaller standby number. Here, a mode or state in which a head is currently used is directed by the data input/output unit.

When a predetermined time elapses, the flag data and the storage address data of the recording surface for copying of the directory of the copied data are deleted to provide a writable region. This supervision is accomplished by the access supervision unit 34. The access state of the recording surface for copy is stored in the directory of the buffer unit 19. The difference between the recording timing written and the time of the timer unit 36 is computed by the operation unit 35. If this computed value exceeds a predetermined time, the directory of the destination is deleted. In case the data copied on the recording surface for copy is rewritten, it is recognized that no data is present in the recording surface for copy. Thus, the directory data and the copy destination directory are deleted.

Figure 10:
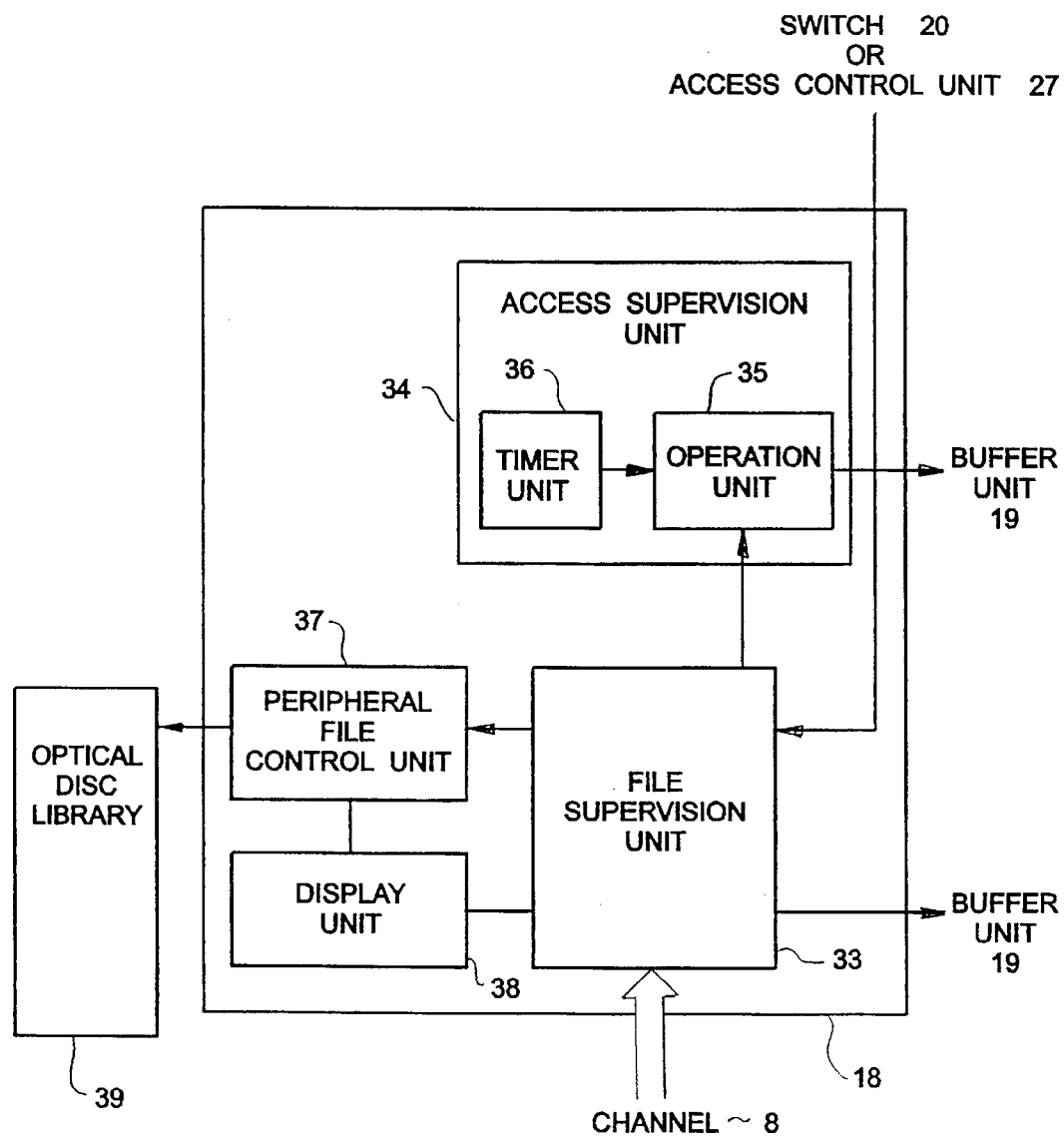
FIG. 10 is a diagram showing an embodiment of an input/output control unit having a control unit of a peripheral file device.

Another embodiment, one in which the data having a less access frequency is edited in another file device connected with the periphery, will be described in the following with reference to FIG. 10. The peripheral file device to be used is exemplified by an optical library device having a large capacity and capable of using a removable medium.

The file supervision unit 33 sends an information command representative of a full condition to a display unit 38 at the instant when the capacity written in the super-large data storage drive according to the present invention reaches a predetermined ratio of the writable capacity. The display unit 38 warns of the impending filling of this storage drive (system), preferably through a visual indicator such as an LED or terminal screen. Simultaneously with this display, the file supervision unit 32 transfers the data having the longest access period of the data written in the present storage drive, by the file supervision unit 32 in accordance with the directory of the buffer unit 19. The file supervision unit 33 transfers the data to be transferred to the buffer unit with a peripheral file control unit 37.

The peripheral file control unit 37 designates the recording address of the data to be transferred and writes the data of the buffer at the corresponding address of the optical disk library. Simultaneously with the end of data recording, the recording end signal is issued to the file supervision unit 33. The file supervision unit 33, having received the recording end signal, deletes the recording address in the directory of the transferred data, and adds the storage address of the peripheral file in place and the accessing data to the peripheral file control unit 37. The replacement of the recording medium is automatically accomplished by the library type optical disk device which has already been put into practice. Thus, all data transfers are supervised by the peripheral file control unit 37.

Next, another method wherein transferred data is rewritten first to a peripheral file device, in case the present storage drive is fully occupied, will be described. The file supervision unit 33, having received the data transfer command, transfers data in accordance with the directory of the buffer unit 19 and it is written in the present storage drive which has the longest rewriting period. The remaining operations will be omitted because they are similar to the aforementioned ones.

Figure 11:
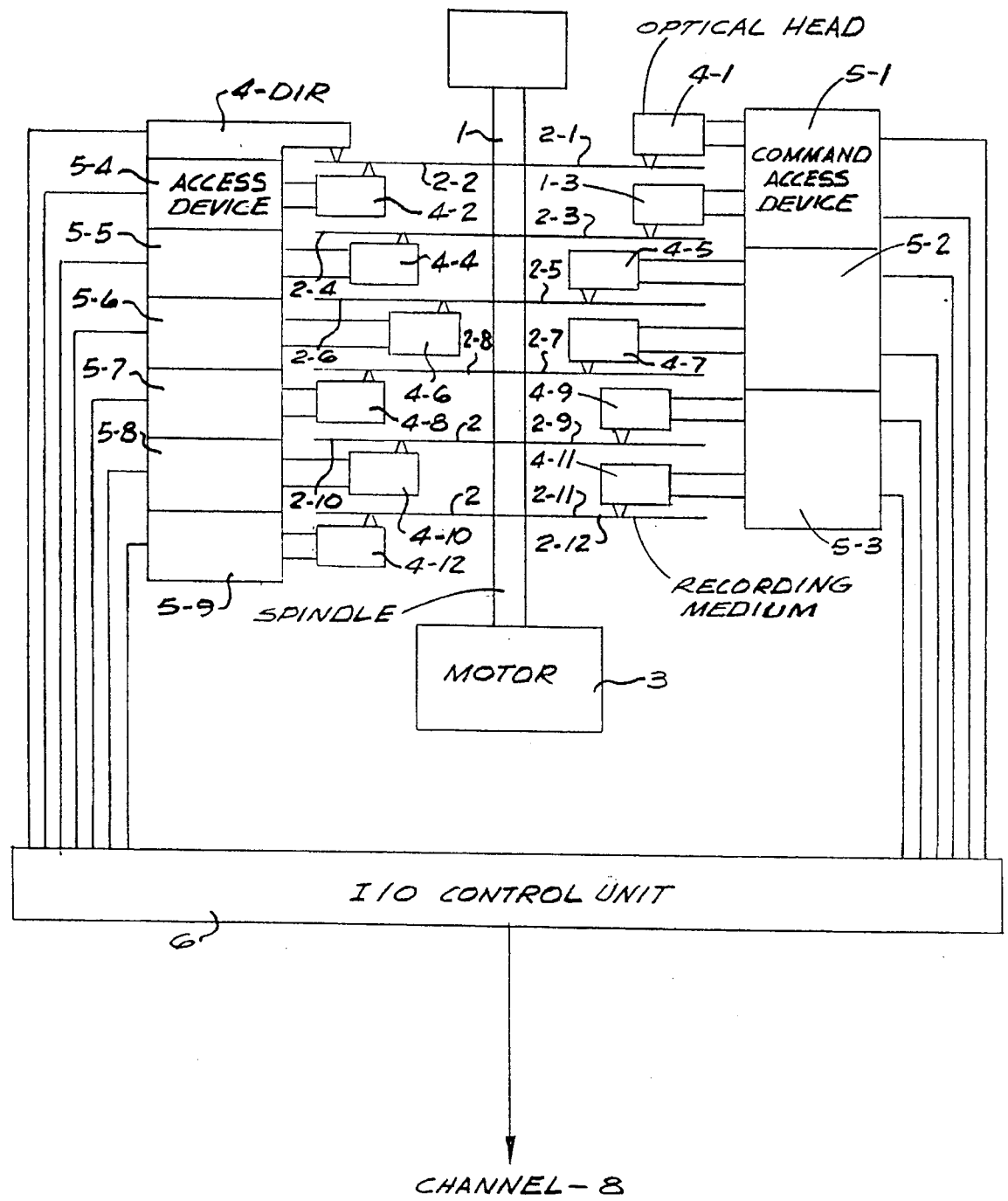
FIG. 11 is a diagram showing an embodiment of the storage drive for writing and reading out in parallel with two recording surfaces.

FIG. 11 shows an embodiment of the super-large capacity data storage drive which also provides a high data transfer rate. The present drive is used as a storage system for handling high-volume data, such as image data, from a number of terminals. In the present embodiment, the writing and readout operations of the two upper recording surfaces are accomplished concurrently. For example, the optical heads 4-1 and 4-3 are coarsely accessed by the one common access device 5-1 but may also be accessed by separate access devices. On the other hand, writing and reading from the lower recording surfaces are accomplished independently of each other.

However, any possible combination of the parallel operations is so arbitrary so as to allow one to combine the lower recording surfaces into all the heads in first and second faces, operable parallely, or into six optical heads 4-1, 4-3, 4-5, 4-7, 4-9 and 4-11 operated by the single access device. This parallel arrangement is effective in case the data transfer rate is to be improved even with a decline of the throughput.

Figure 12:
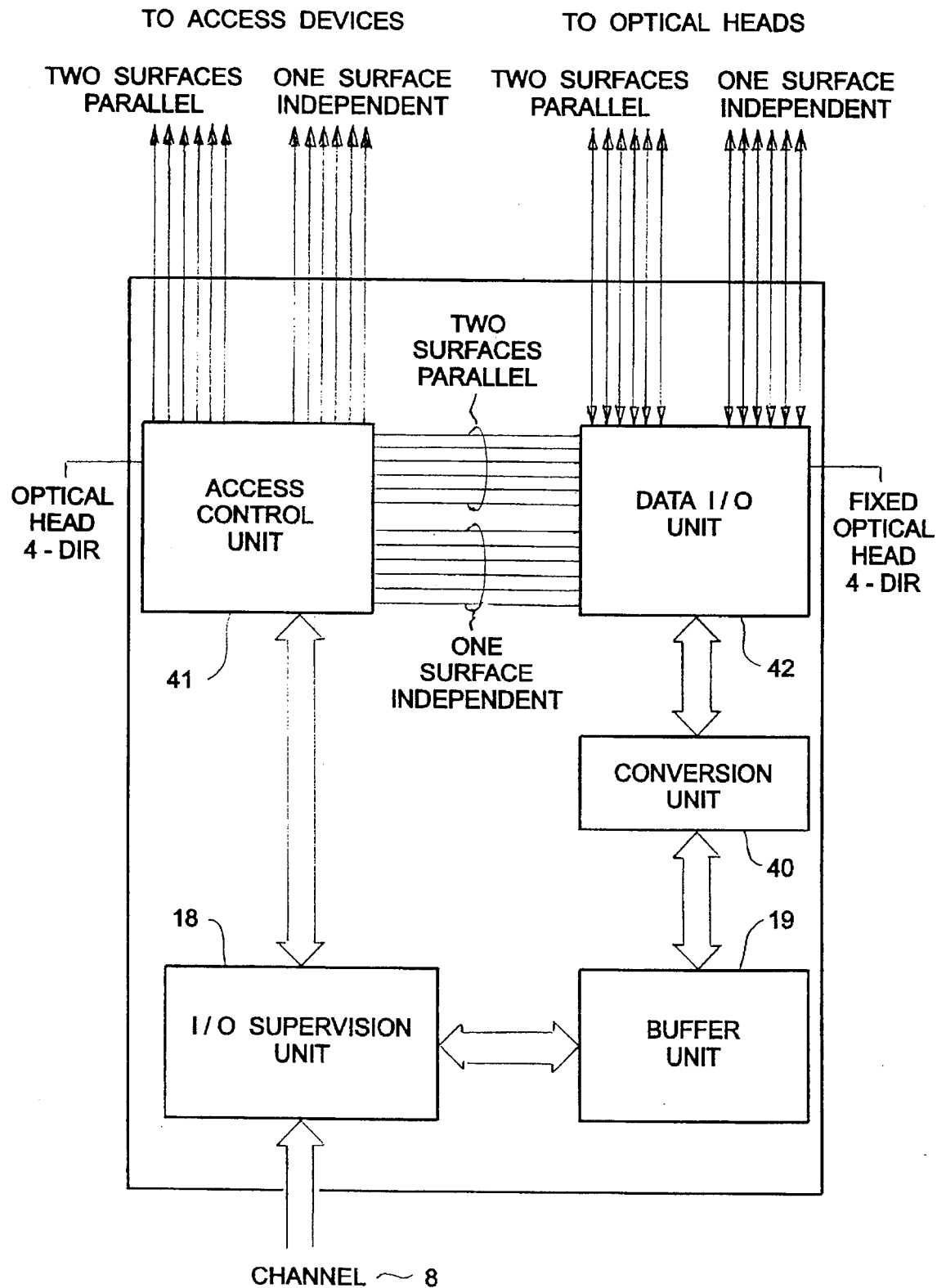
FIG. 12 is a diagram showing the structure of the input/output control unit of the storage drive for writing and reading out in parallel.

The parallel writing method will be described in the following with reference to FIG. 12. The data transferred from the channel 8 is first determined by the input/output supervision unit 18 as to whether the writing is to be accomplished in parallel in the two surfaces, or merely in a single surface. This decision is made in accordance with the size or kind of the data. For example, code data is written in the single surface, whereas the image data is concurrently written in the two surfaces. For this operation, a flag (or discriminator) for specifying the size and kind has to be added to the data. After it has been determined whether the writing is parallely or singly accomplished, the input/output supervision unit 18 determines the writing address. In a single surface writing case, one address is determined similarly to the foregoing embodiment.

In the parallel writing case, two addresses of a common sector of a common track of the two different surfaces, i.e., the one hundredth track and the fourth sector of the first surface and the one hundredth and the fourth sector of the third surface, are determined. Next, the input/output supervision unit 18 transfers the data to the large-capacity buffer unit 19 and issues the access command to an access control unit 41 to drive the access device. This access device is capable of accessing the two optical heads together, i.e., the access device 5-1 for accessing the recording surfaces 2-1 and 2-3. The data is converted into two-channel parallel data in a conversion unit 40 from the buffer unit 19. Since, however, no conversion is required in the case in which the channel numbers of the data from the channels and the parallel recording are equal, the data is transferred without change to a data input/output unit 42.

Figure 14:
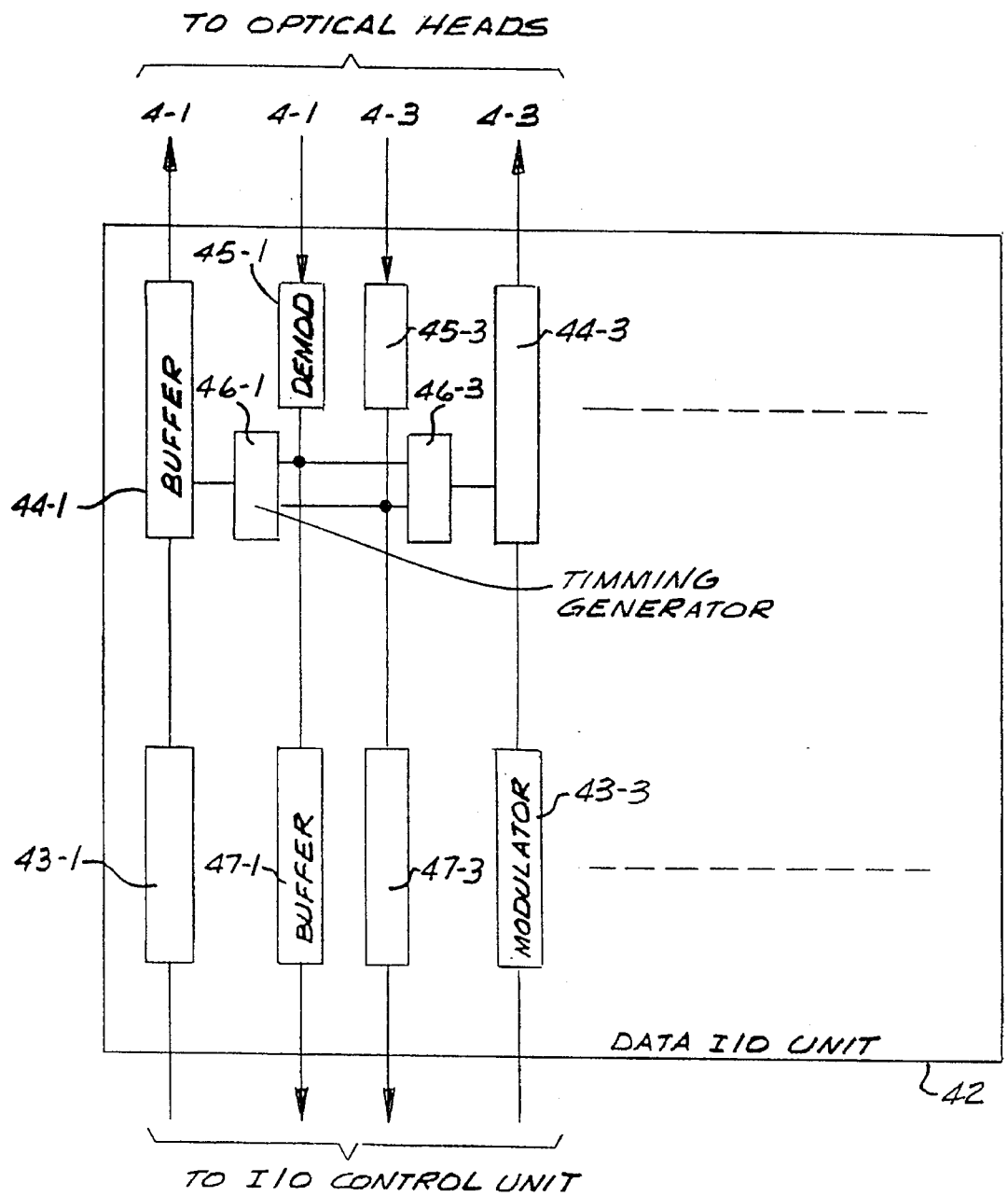
FIG. 14 is a diagram showing the structure of data input/output unit of the storage drive capable of writing and reading out in parallel.

Coding and error correcting codes are added by a modulator 43 in the data input/output unit 42 shown in FIG. 14 and temporarily saved in a buffer 44 in the same unit as writing timing is awaited. The access control unit 41 drives the access unit 5-1 and accesses the heads 4-1 and 4-3 simultaneously in a coarse manner. The header signals, which are read out from the respective heads determined for the appointed tracks, are translated by a demodulator 45 in the data input/output unit 42. When the ID signals of target sectors to be written are sent from the respective recording surfaces, a timing generator 46 provides start signals conforming to the respective timings to start the writing operations. However, the parallel signals may possibly be written with a delay of about one rotation in the event that a relative sector or head positions of the recording surfaces are displaced or in case the fine access end times are different.

Figure 13:
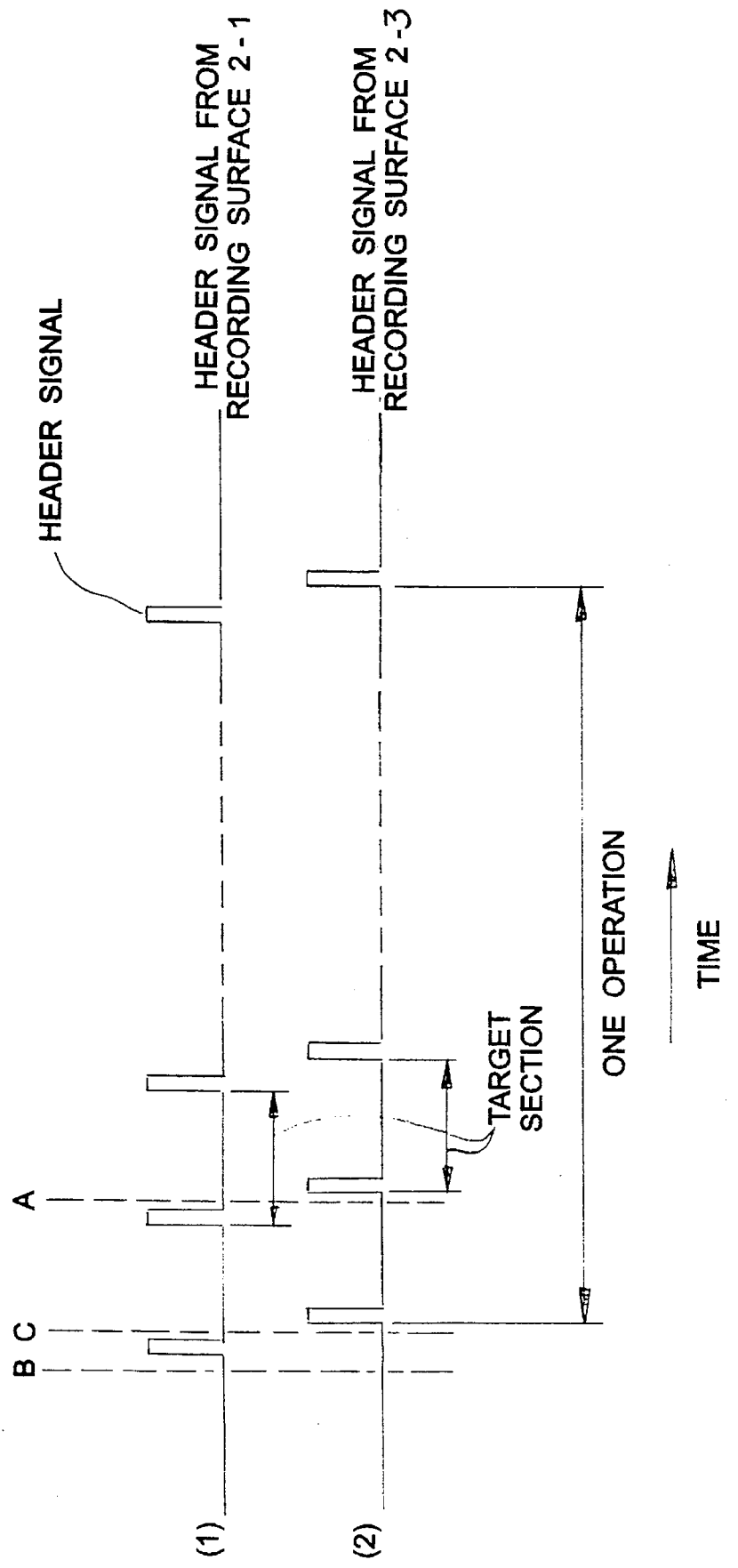
FIG. 13 is a diagram showing one example of header signals coming from the two recording surfaces.

In a case, for example, that the fine accesses are simultaneously ended at point A of FIG. 13, the parallel signals are written with the delay of about one rotation. In order to prevent this, the writing operation is started by the following method.

After one recording surface 2-1 is used to discriminate the sector-one sector on this side of the target sector, the sector-one sector on this side of the target sector is isolated within a predetermined time (corresponding to about one sector) by another recording surface (namely, the fine access is ended at or before point B of FIG. 13). In this case, the individual recording surfaces start their writing operations in conformity to the timing of the target sector to appear next. On the other hand, the recording surface 2-3 recognizes the sector one sector this side of the target sector (namely, in case the fine access is ended at point C of FIG. 13). In this case, the writing operation is started while leaving the recording surface 2-1 as it is, and the recording surface 2-3 starts the writing operation from the target sector to appear next. In order to minimize the displacement of the sector positions, it is therefore desirable to complete a format operation using the individual optical heads after the disks are mounted.

Next, the method of reading out the data written in parallel will be described in the following. If an access is requested of the input/output supervision unit 18 through the channel 8, the supervision unit 18 reads out the directory which is written in the directory region of the buffer unit 19. It is assumed that the data required for the access be written in parallel in the recording medium surfaces 2-1 and 2-3. The input/output supervision unit 18 judges this address (e.g., the track number or the sector number), and issues the access command to the access control unit 27 to drive the access unit 5-1. The data are read at the instant when the individual heads reach the target sector. If, however, the sector positions are displaced, the parallel data may be read out with a displacement of one revolution like the writing case. In accordance with the procedures like the writing operations, therefore, the readout of the data is started.

After the demodulation and error correction of the demodulator 45 in the data input/output unit 42, the data is saved in a buffer 47 of the data input/output unit 42. As soon as the data of the two channels are stored in the buffer 47, the two-channel parallel data are converted into the parallel channel number by the conversion unit 40 and transferred to the buffer unit 19. The data thus transferred is then transferred to the input/output supervision unit 18, and then to the channel while being stored in the buffer unit 19.

Figure 15:
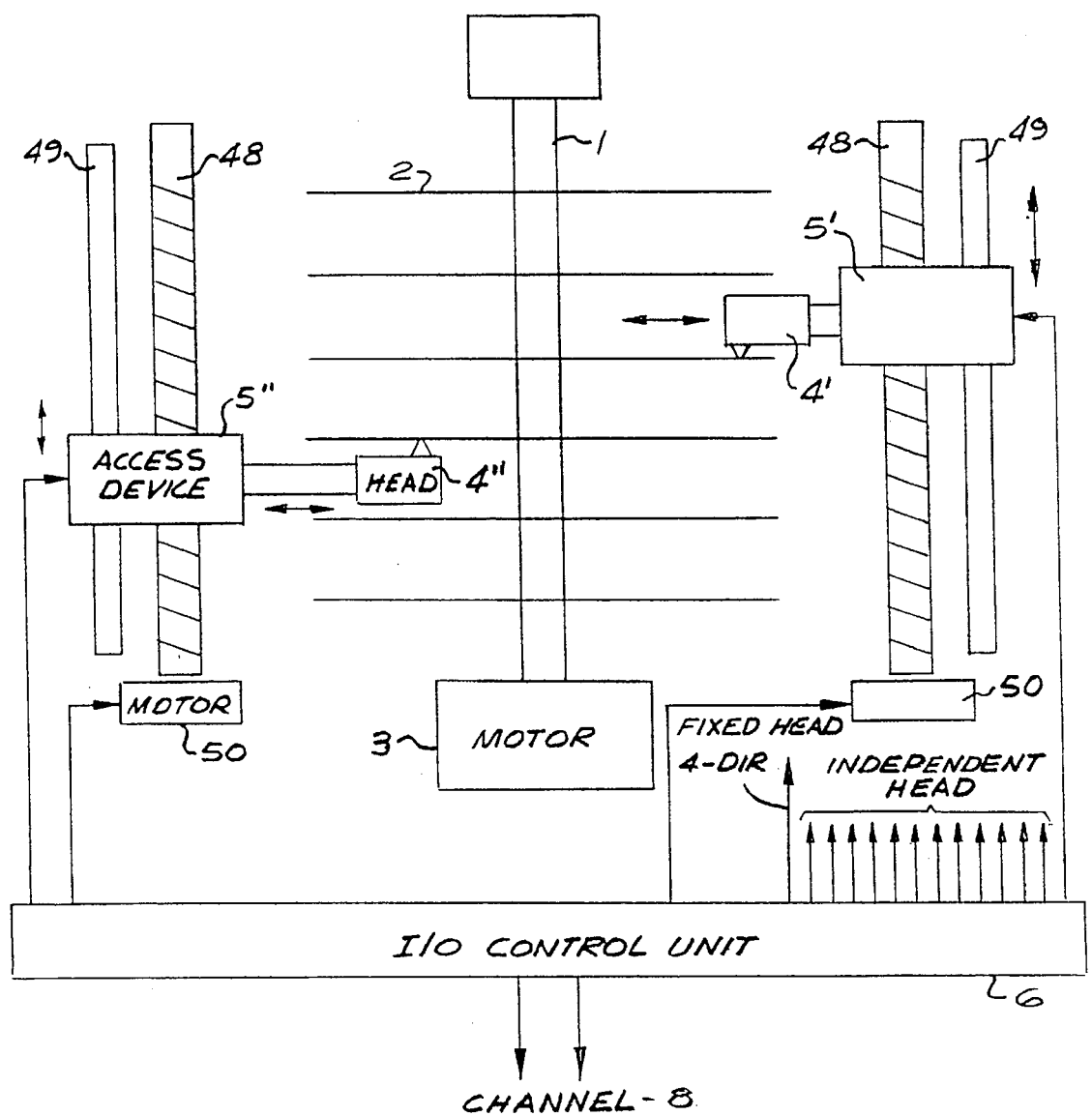
FIG. 15 is a diagram showing one embodiment of the storage drive having optical heads capable of moving between the recording surfaces.

FIG. 15 shows another embodiment in which the throughput is improved while simultaneously limiting the expense of fabrication. In order to simplify the illustration, however, each recording surface is equipped with at least one read/write head, although not shown. In a case of the data storage drive having each recording surface equipped with one optical head, for example, the access frequency is usually no higher than the throughput of the data storage drive, but the accesses may be temporarily concentrated at a certain recording surface. Thus, the access standby time is abruptly increased if the access frequency exceeds the throughput of the recording surface, although this condition is generally temporary. Therefore, the present embodiment is equipped at each recording surface with not only independently accessible read/write heads, but also with a head capable of moving between the recording surfaces. The concentrated accesses are handled by moving the movable head to the access-concentrated recording surface to accomplish the accesses.

Figure 16:
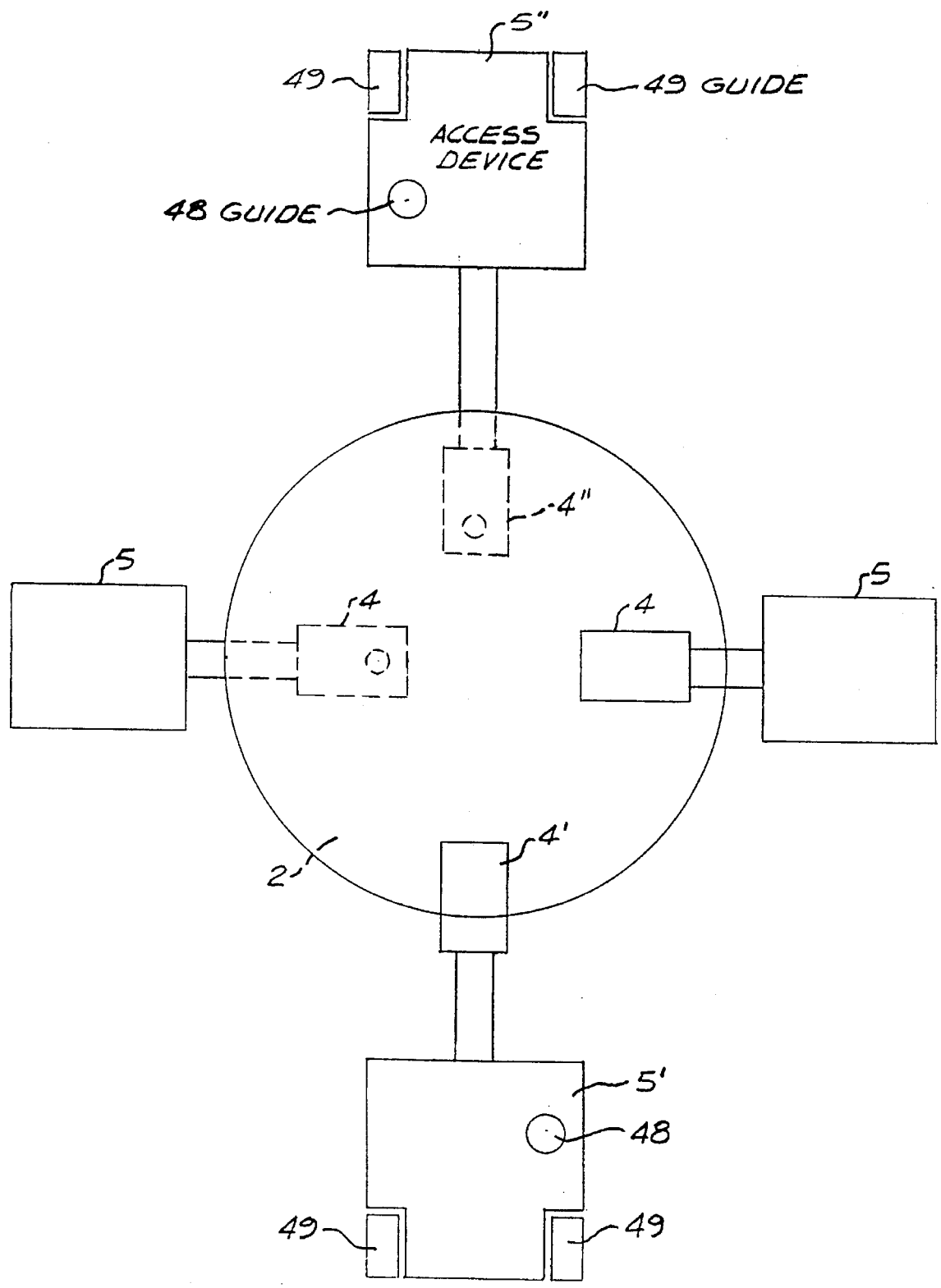
FIG. 16 is a diagram showing the head structure of the storage drive having the optical heads capable of moving between the recording surfaces.

FIG. 16 shows the head structure according to the present embodiment. Each recording surface 2 is equipped with optical heads 4, which can be independently driven. Access devices 5 and optical heads 4' and 4" are made movable between the recording surfaces for accessing the upward and recording surfaces, respectively, which are driven by access devices 5' and 5". These heads and access devices, moving between the recording surfaces, are supported in a manner to move in the spindle direction by guides 49 so that they are driven in the spindle direction by turning helically threaded guides 48 by motors 50.

Figure 17:
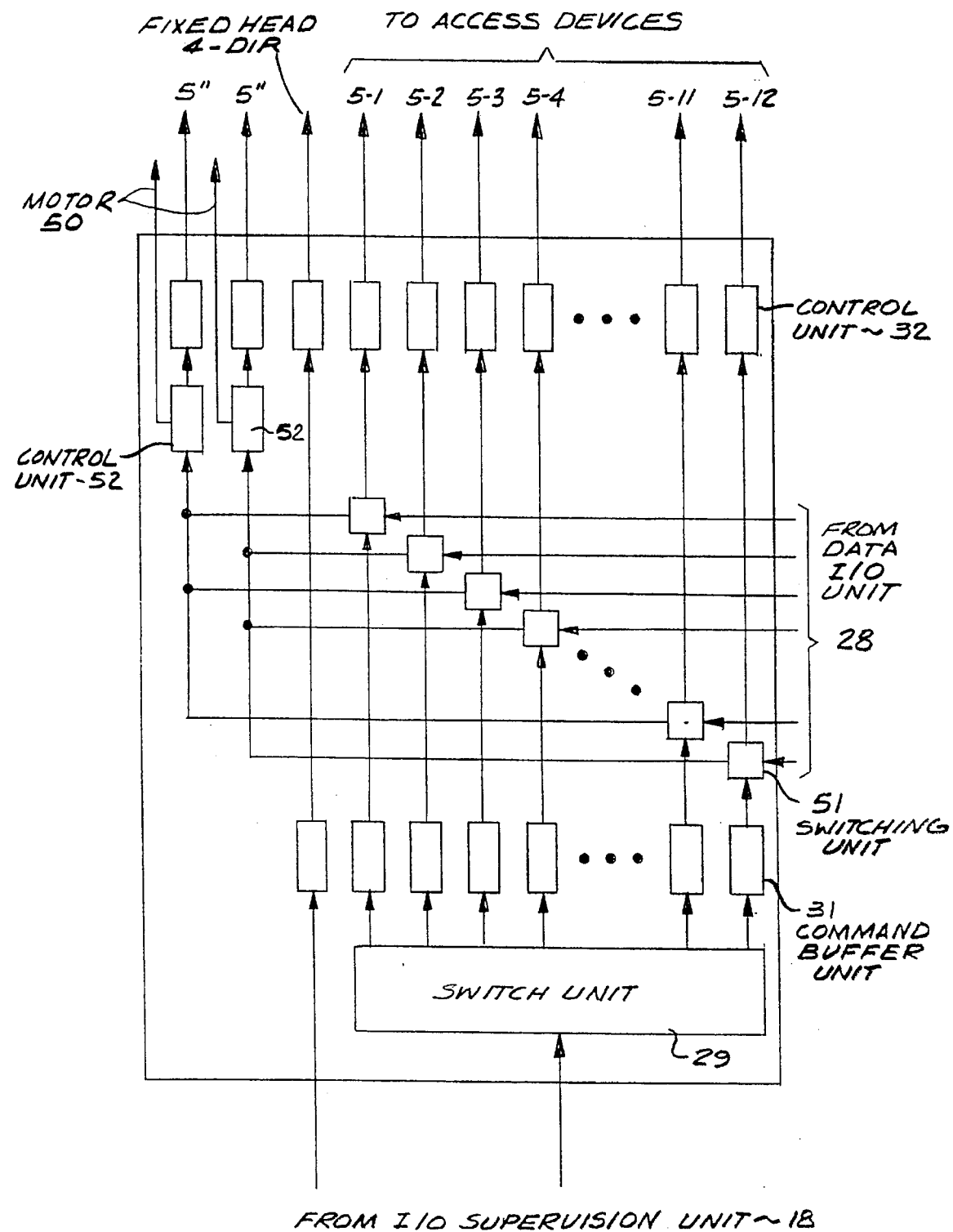
FIG. 17 is a diagram showing the structure of the access control unit of the storage drive having the optical heads capable of moving between the recording surfaces.

FIG. 17 is a diagram showing the structure of the access control unit for controlling all the optical heads belonging to the individual recording surfaces with the optical heads made movable between the recording surfaces, in accordance with a particular system requirement. If an access command is given through the channel, the input/output supervision unit 18 designates the data storage address so that the switch unit 29 accordingly sends the access command to the appointed recording surface. The access command is saved in either the appointed individual recording surfaces or the command buffer units 31 belonging to the access devices. The operation states of the optical heads are supervised by the data input/output unit 28 so that a switching unit 51 issues the command as it is from the command buffer units 31 to the control units 32 if the heads under consideration are not being accessed. If these heads are being accessed, the switching unit 51 receives the end signal from the data input/output unit 28, when the access or transfer of the data is ended, and sends the command, which has been saved the earliest in the buffer, to the control units 32.

In case the access frequency is increased, or if the accesses are concentrated in a certain recording surface, many access commands accumulate in the instruction buffer unit 31 of that recording surface. If the number of the access commands accumulated in the command buffer unit 31 exceeds a predetermined constant value Ns, the switching unit 51 issues the access command to the optical heads made movable between the recording surfaces. The control unit 52, having received the access command, first causes the control unit 32 to move the optical heads from the most distant position from the recording surface. If it is confirmed that the optical heads are out of position, the optical head and the access device are driven to move to the target recording surface by the motor 50 in accordance with the information on appointment of the recording surface. The stop position is determined by the scale 49. Alternatively, a fixed target or light source may be provided and detected. After movement to the target recording surface, the access is started like the other optical heads. In case, however, the heads and the access devices should not be moved between the recording surfaces, the heads never fail to be brought into the positions the most distant from the recording surfaces.

In case the number of the standby state commands in the command buffer unit of the recording surface, in which the movable head is operating, is smaller than a predetermined number Ne of 1 or more, the switching unit 51 switches the command destination to the ordinary movable head to set the movable head free. Here, a value of Ne is a set for the recording surfaces for which a standby number exceeds a value of Ns and also exceeds a number of a recording surface having its heads operational. For example, Ne=Ns/2, in case there is another recording surface higher than Ns, and otherwise Ne=1.

In the embodiments thus far described, the numbers of the recording surfaces, the heads, and the heads movable between the recording surfaces can be also be increased, and those embodiments can be combined. These have a different throughput and drive prices so that the embodiments and their combinations can be determined according to the field and method of application and budget.

Accordingly, the present invention provides a data storage drive which has a small occupancy volume, a low cost and a high throughput although it has a super-large capacity. There can be attained an effect that the simultaneous accesses from a large number of terminals may be handled with little standby time. This effect is improved the better for the larger number of recording surfaces.

Figure 18:
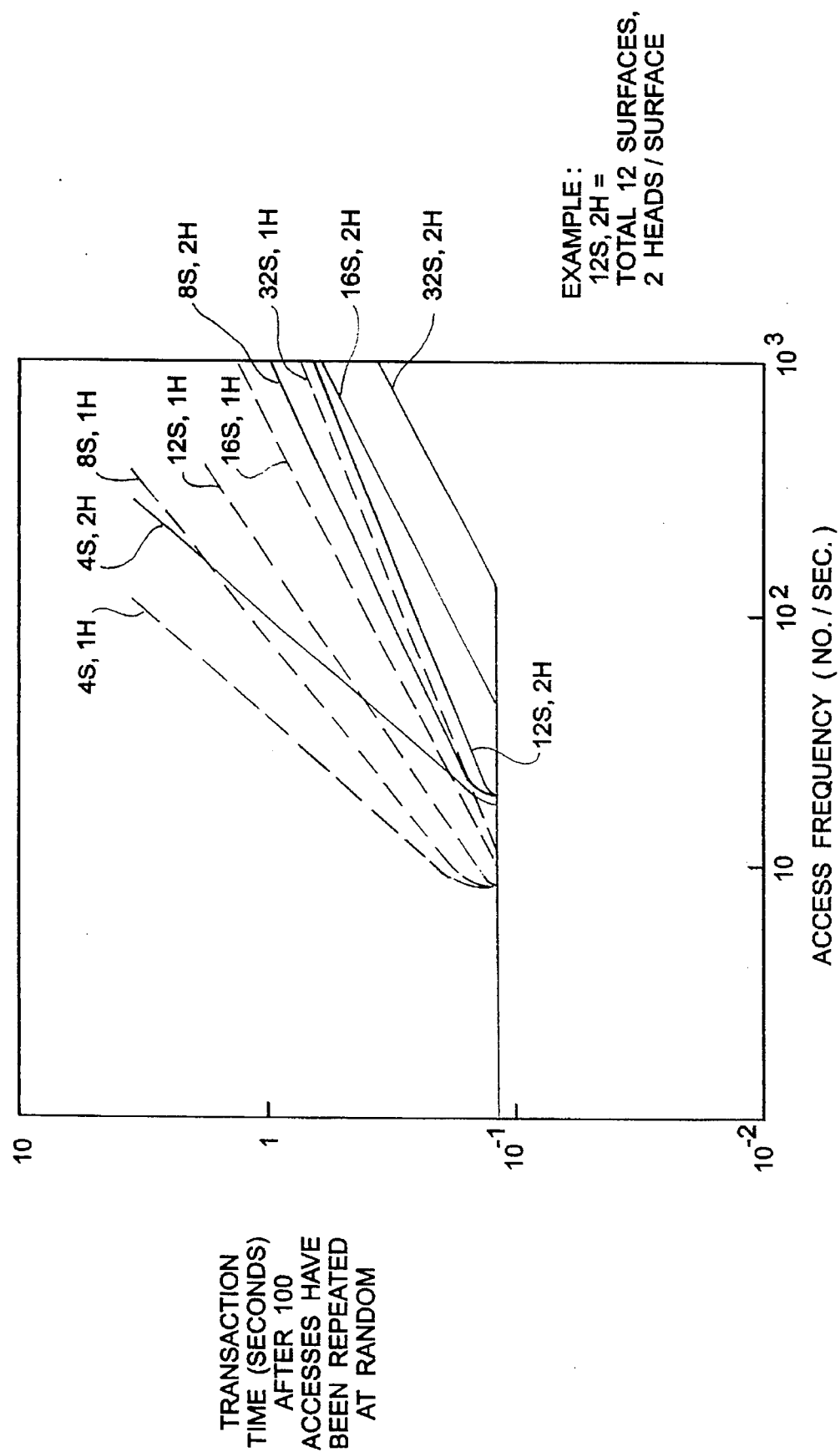
FIG. 18 is a graph presenting the results obtaining the transaction time by simulating the random access states.

FIG. 18 presents the results which are obtained by simulating the transaction time for the access frequency. The transaction time is a time period from the start of an access request to the end of writing or reading out the data. Here, the seek time is set at 100 ms, the number of revolutions of the recording medium at 3,600 r.p.m., and the data unit at 32 KB. It is assumed that the recording surfaces are accessible randomly. The simulations are performed in accordance with the first embodiment, wherein two independent heads are arranged for each recording surface.

The transaction time increases when the access frequency exceeds a predetermined value, as shown in FIG. 18, because a recording surface is newly requested for an access so that the standby time increases while all the heads of the recording surface are being accessed, written or read out. If the access frequency at which the transaction time starts to increase, FIG. 19 illustrates that the throughput is improved by arranging two independent heads at each recording surface. It is also found that the effect is higher for more recording surfaces. Under the above-specified conditions, for example, the throughput improvement is about two times in case the total recording surfaces are 12 or less, but the improvement is four times or higher for 16 or more total recording surfaces. The reason why the throughput improvement is higher for the larger number of heads per recording surface if the number of recording surfaces is more is as follows.

It is initially assumed that there be N disk surfaces for recording, each of which is accessed with an equal probability. A certain recording surface is requested for an access, and this access request occurs A times while the heads are busy. The probability of one of those access requests to a common recording surface is about 1/N, and the probability of another access is about 1/N. Specifically, the probability for one head to become busy is about N-th in case the head is provided for one recording surface, and the probability for the two heads to become busy is about one 1/N2 in case the two independently accessible heads are provided for one recording surface. As described above, the probability of accessing a common recording surface while the head is busy is drastically reduced as the number of the independently accessible writing and readout heads for each recording surface is increased. Therefore the throughput can be drastically improved. This effect is higher for the larger number N of the recording surfaces.

In case the access frequency is far lower than the throughput, on the other hand, the seek time and revolution standby time are also shortened because the data is read out by the head closer to the target sector by providing the plural heads on the recording surface.

In shared files of the data base, moreover, it is necessary to cope with access concentration. Specifically, the accesses to several specific files are frequently concentrated. In this case, the discussion thus far made assumes that the random access cannot be applied, but the transaction rate can be increased by using concentrated data or by implementing a parallel transaction using a head capable of moving between the recording surfaces.

In cases where large quantities of data, such as a high resolution images, are to be written or read out, transfers take a long time and drop throughput substantially. By accomplishing the parallel readout and writing by using the fourth embodiment, i.e., the plural heads, therefore, the data transfer rate can be improved to improve the throughput.

The invention has been described with reference to the preferred alternate embodiments. Obviously, modifications and alterations will occur to others upon a reading and understanding of this specification. It is intended to include all such modifications and alterations insofar as they come within the scope of the appended claims or the equivalents thereof.

Having thus described the invention, it is now claimed:

1. A fast access high capacity data storage system comprising:

a plurality of generally disk-shaped recording surfaces secured to a common spindle;

a first plurality of data access heads in generally close proximity relative to a first disk-shaped recording surface of the plurality of recording surfaces, whereby each data access head of the first plurality of data access heads is adapted for data communication with the first disk-shaped recording surface;

means for rotating the common spindle in relation to each of the first plurality of data access heads;

means for independently positioning each data access head of the first plurality of data access heads in relation to the first disk-shaped recording surface of the plurality of recording surfaces;

a second plurality of data access heads, distinct from the first plurality of data access heads, in generally close proximity to a copy recording surface of the plurality of generally disk-shaped recording surfaces;

a control system for selectively communicating data with each data access head, the control system including,
  monitoring means for supervising a storage of an address of the data,
  means for storing data representative of an access frequency of at least one of a write, readout and rewrite of the data,
  means for controlling the transfer of most frequently accessed data, as determined by the data representative of access frequency, to the copy recording surface, and
a data supervision system including,
  means for recording at least one of (a) address data representative of an address to which a data record is written, (b) record length data representative of a length of a data record, (c) transfer timing data representative of a duration necessary for transferring location of a data record, and (d) access timing data representative of a number of accesses to a data record;
  average computing means for computing an average of at least one of said address data, record length data, transfer timing data, and access timing data, and means for storing data representative of an average computed by the average computing means; and means for independently positioning each of the second plurality of data access heads relative to the copy recording surface under the control of the control system.

2. The fast access high capacity data storage system of claim 1 wherein the control system further includes means for writing directory data to a directory data storage area concurrently with a writing of a data record in accordance with a computed average.

3. A method of data storage comprising the steps of:

independently positioning each data access head of a first plurality of data access heads in generally close proximity to a first generally disk-shaped data recording surface of a plurality of generally disk-shaped data recording surfaces;

selectively positioning at least one of said data access heads in generally close proximity to another of the plurality of data recording surfaces, to thereby be in data communication with the another recording surface;

receiving a plurality of simultaneous access requests from a plurality of sources;

rotating the plurality of data recording surfaces relative to the data access heads;

simultaneously communicating data with a selected subset of data access heads, such that data is communicated between data access heads and at least one recording surface;

storing access frequency data representative of access frequency of at least one of writing, readout and rewrite of the data;

supervising a storage of the data between recording surfaces according to the access frequency data;

recording at least one of (a) address data representative of an address to which a data record is written, (b) record length data representative of a length of a data record, (c) transfer timing data representative of a duration necessary for transferring location of a data record, and (d) access timing data representative of accesses to a data record;

computing an average of at least one of said address data, record length data, transfer timing data, and access timing data; and storing data representative of an average computed by the average computing means;

selectively controlling said secondary data storage device in accordance with data communicated to the secondary storage device so as to store at least one of most frequently accessed data and least frequently accessed data as indicated by the access frequency data;

storing data representative of a total capacity of the plurality of data recording surfaces;

calculating data representative of available storage capacity of the plurality of data recording surfaces;

storing data representative of a least recently used data record stored on the plurality of data recording surfaces;

comparing the data representative of available storage capacity and the data representative of total storage capacity; and transferring said least recently used data record from the plurality of data recording surfaces to the secondary data storage device.

4. The method of claim 3 further comprising a step of:

writing directory data to a directory data storage area concurrently with a writing of a data record in accordance with a computed average.

5. The method of claim 3 further comprising the steps of:

independently positioning each of a second plurality of data access heads relative to a copy recording surface;

calculating a rate of access to data records stored on selected recording surfaces of the plurality of data recording surfaces;

storing data representative of a preselected acceptable rate of accesses to records stored on said selected recording surfaces;

comparing a calculated rate of access of a selected record to the data representative of the preselected acceptable rate of access;

copying a data record to the copy recording surface in accordance with a result of the comparing step.

6. The method of claim 3 further comprising a step of selectively moving a data access head from the plurality of data access heads to be in generally close proximity to a second surface of the plurality of data recording surfaces so as to be in data communication therewith.

* * * * *